United States Patent
Tatedoko et al.

(10) Patent No.: US 11,467,565 B2
(45) Date of Patent: Oct. 11, 2022

(54) ATTACK/ABNORMALITY DETECTION DEVICE, ATTACK/ABNORMALITY DETECTION METHOD, AND ATTACK/ABNORMALITY DETECTION PROGRAM

(71) Applicant: MITSUBISHI ELECTRIC CORPORATION, Tokyo (JP)

(72) Inventors: Masashi Tatedoko, Tokyo (JP); Tsuyoshi Higuchi, Tokyo (JP); Kiyoto Kawauchi, Tokyo (JP); Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 620 days.

(21) Appl. No.: 16/466,188

(22) PCT Filed: Jan. 25, 2017

(86) PCT No.: PCT/JP2017/002478
§ 371 (c)(1),
(2) Date: Jun. 3, 2019

(87) PCT Pub. No.: WO2018/138793
PCT Pub. Date: Aug. 2, 2018

(65) Prior Publication Data
US 2020/0073369 A1 Mar. 5, 2020

(51) Int. Cl.
*G06F 21/00* (2013.01)
*G05B 19/418* (2006.01)
*G06F 21/55* (2013.01)

(52) U.S. Cl.
CPC ... *G05B 19/4184* (2013.01); *G05B 19/41885* (2013.01); *G06F 21/554* (2013.01)

(58) Field of Classification Search
CPC .......... G05B 19/4184; G05B 19/41885; G06F 21/554
See application file for complete search history.

(56) References Cited

U.S. PATENT DOCUMENTS

| 7,168,065 | B1* | 1/2007 | Naccache | G06F 21/52 717/124 |
| 2014/0279795 | A1* | 9/2014 | Shibuya | G05B 23/0221 706/46 |
| 2015/0057821 | A1* | 2/2015 | Nasle | G06Q 10/04 700/291 |

FOREIGN PATENT DOCUMENTS

| CN | 102624736 A | * | 8/2012 | ......... G05B 23/0221 |
| DE | 112012007224 T5 | | 10/2015 | |

(Continued)

OTHER PUBLICATIONS

Maier et al. (NPL "Automated generation of timing models in distributed production plants" In 2013 IEEE International Conference on Industrial Technology) (Year: 2013).*

(Continued)

*Primary Examiner* — Tri M Tran
(74) *Attorney, Agent, or Firm* — Birch, Stewart, Kolasch & Birch, LLP

(57) ABSTRACT

An attack/abnormality detection device includes: a command extraction unit configured to extract elements having the same command destination as a command destination of an additionally received actual manufacturing command from among each of a set of normal manufacturing commands and a set of actual manufacturing commands, which contain information on a command destination and an arrival order, and are stored in a command storage region; and a detection unit configured to detect an attack or an (Continued)

abnormality by comparing details of the commands with each other for each arrival order of both extracted elements.

10 Claims, 16 Drawing Sheets

(56) References Cited

FOREIGN PATENT DOCUMENTS

| EP | 2 752 722 A1 | | 7/2014 | |
|---|---|---|---|---|
| EP | 2752722 A1 | | 7/2014 | |
| JP | 2012-59032 A | | 3/2012 | |
| JP | 2013-218725 A | | 10/2013 | |
| JP | 2016-14992 A | | 1/2016 | |
| JP | 2016014992 A | * | 1/2016 | ........... G08B 21/187 |
| JP | 2016-106298 A | | 6/2016 | |
| WO | WO 2014/090310 A1 | | 6/2014 | |

OTHER PUBLICATIONS

Graeser et al. (NPL "Automation as a basis for offline and real time simulation" in 8th International Conference on Informatics in Control, Automation and Robotics (ICINCO 2011) (Year: 2011).*
Google Scholar Results NPL (Year: 2022).*
Indian Office Action for Indian Application No. 201947026600, dated Mar. 12, 2021, with English translation.
German Office Action, dated Apr. 24, 2020, for German Application No. 112017006528.3, with an English translation.
Graeser et al., "AutomationML as a Basis for Offline—and Realtime-Simulation, Planning, Simulation and Diagnosis of Automation Systems," ICINCO 2011—8th International Conference on informatics in Control, Automation and Robotics, 2011, pp. 359-368.
Maier et al., "Automated Generation of Timing Modeis Indistributed Production Plants," 2013 IEEE International Conference on Industrial Technology (ICIT), 2013, pp. 1086-1091.

* cited by examiner

ATTACK/ABNORMALITY DETECTION DEVICE, ATTACK/ABNORMALITY DETECTION METHOD, AND ATTACK/ABNORMALITY DETECTION PROGRAM

TECHNICAL FIELD

The present invention relates to a technology of detecting illegal tampering/insertion and discarding due to an abnormality such as a failure or a cyberattack on a command (hereinafter referred to as "manufacturing command") relating to control of, for example, a factory or a plant.

BACKGROUND ART

There is disclosed a method of detecting an abnormality in a manufacturing process by using a product ID for identifying a product to be manufactured, which is contained in a manufacturing command (refer to Patent Literature 1, for example).

Further, there is disclosed a method of detecting an abnormality by acquiring in advance, by simulation, a normal operation status of, for example, a factory or a plant, and comparing an actual operation status of, for example, the factory or the plant with a simulation result acquired in advance (refer to Patent Literature 2, for example).

CITATION LIST

Patent Literature

[PTL 1] JP 2016-014992 A
[PTL 2] JP 2013-218725 A

SUMMARY OF INVENTION

Technical Problem

However, the related art has the following problem.

The related-art methods described in Patent Literatures 1 and 2 acquire a flow of normal manufacturing commands by simulation, and store, in advance, time-series data on the order of manufacturing commands as a group of normal commands. Further, the related-art methods also store, in advance, time-series data on the order of manufacturing commands in, for example, an actual factory or plant, as a group of actual commands in a similar manner.

Then, when an additional manufacturing command is generated in, for example, the actual factory or plant, the related-art methods can detect an attack or abnormality of the additional manufacturing command by extracting only commands each having a product ID of the additional manufacturing command from among the groups of normal commands and actual commands, and comparing the extraction results with each other. However, when there is a manufacturing command that does not contain a product ID, the related-art methods have a difficulty in detecting an attack or an abnormality.

The present invention has been made in order to solve the above-mentioned problem, and has an object to provide an attack/abnormality detection device, an attack/abnormality detection method, and an attack/abnormality detection program, which are capable of detecting illegal tampering or insertion and discarding due to an abnormality such as a failure or a cyberattack even when there is a manufacturing command that does not contain a product ID.

Solution to Problem

According to one embodiment of the present invention, there is provided an attack/abnormality detection device, which is configured to detect an attack or an abnormality included in a manufacturing command in an actual factory, the attack/abnormality detection device including: a storage unit; a command extraction unit; and a detection unit, wherein the storage unit includes a normal command storage region storing a set of normal manufacturing commands, and an actual command storage region storing a set of actual manufacturing commands transmitted from the actual factory, wherein the command extraction unit is configured to: receive, from the actual factory, an actual manufacturing command containing a command destination, a command name, and a command parameter; assign an actual manufacturing command having the same command destination with an arrival order number in order of reception of the actual manufacturing command, and store the actual manufacturing command into the actual command storage region as one element of the set of actual manufacturing commands; extract, when the actual manufacturing command has currently been received, elements having the same command destination as a command destination contained in the currently received actual manufacturing command as a group of normal commands from among the set of normal manufacturing commands stored in the normal command storage region as a configuration including a command destination, a command name, a command parameter, and an arrival order; and extract elements having the same command destination as the command destination contained in the currently received actual manufacturing command as a group of actual commands from among the set of actual manufacturing commands stored in the actual command storage region, and wherein the detection unit is configured to execute first detection processing of comparing the group of normal commands and the group of actual commands, which are extracted by the command extraction unit, with each other for each arrival order, to thereby detect the attack or the abnormality.

Further, according to one embodiment of the present invention, there is provided an attack/abnormality detection method to be executed by an attack/abnormality detection device configured to detect an attack or an abnormality contained in a manufacturing command in an actual factory, the attack/abnormality detection method including: a first step of receiving, from the actual factory, an actual manufacturing command containing a command destination, a command name, and a command parameter; a second step of assigning an actual manufacturing command having the same command destination with an arrival order number in order of reception of the actual manufacturing command, and storing the actual manufacturing command into an actual command storage region as one element of a set of actual manufacturing commands; a third step of storing, in advance, a normal set of manufacturing commands into a normal command storage region as a configuration including a command destination, a command name, a command parameter, and an arrival order; a fourth step of extracting, when the actual manufacturing command has currently been received, elements having the same command destination as a command destination contained in the currently received actual manufacturing command as a group of normal commands from among the set of normal manufacturing commands stored in the normal command storage region in the third step; a fifth step of extracting elements having the same command destination as the command destination contained in the currently received actual manufacturing command as a group of actual commands from among the set of actual manufacturing commands stored in the actual command storage region; and a sixth step of executing first detection processing of comparing the group of normal commands extracted in the fourth step and the group of actual commands extracted in the fifth step with each other for each arrival order, to thereby detect the attack or the abnormality.

Further, according to one embodiment of the present invention, there is provided an attack/abnormality detection program for achieving functionality as the command extraction unit and the detection unit included in the attack/abnormality detection device.

Advantageous Effects of Invention

According to one embodiment of the present invention, there are provided: the configuration of extracting elements having the same command destination as a command destination of an additionally received actual manufacturing command from among each of the set of normal manufacturing commands and the set of actual manufacturing commands, which contain information on the command destination and the arrival order, and are stored in the command storage region; and the configuration of detecting an attack or an abnormality by comparing details of the commands with each other for each arrival order of both extracted elements. As a result, there are provided the attack/abnormality detection device, the attack/abnormality detection method, and the attack/abnormality detection program, which are capable of detecting illegal tampering/insertion and discarding due to an abnormality such as a cyberattack or a failure even when there is a manufacturing command that does not contain a product ID.

DESCRIPTION OF EMBODIMENTS

A description is now given of an attack/abnormality detection device, an attack/abnormality detection method, and an attack/abnormality detection program according to preferred embodiments of the present invention with reference to the accompanying drawings.

The present invention focuses on the fact that the order of issuing manufacturing commands to, for example, a production facility serving as a destination of the manufacturing command, is ensured for each destination of the manufacturing command not only in, for example, a factory or plant for high-mix low-volume production but also in mass customization production in which low-mix high-volume production is required. Further, on the basis of this fact, the present invention has a technical feature of solving the related-art problem by comparing a group of normal commands with a group of actual commands through extraction of only the manufacturing commands each having the same destination as that of an additional manufacturing command generated in, for example, a factory or a plant.

In each embodiment described below, a description is given of, for example, an attack/abnormality detection device capable of detecting an attack or an abnormality by comparing normal manufacturing commands acquired from a computer (hereinafter referred to as "simulation device") configured to simulate a flow of normal manufacturing commands with a flow of actual manufacturing commands acquired from, for example, an actual factory/plant (hereinafter referred to as "actual factory"). An information processing method in the present invention can be implemented by a procedure illustrated in a flowchart of each embodiment.

First Embodiment

Figure 1:
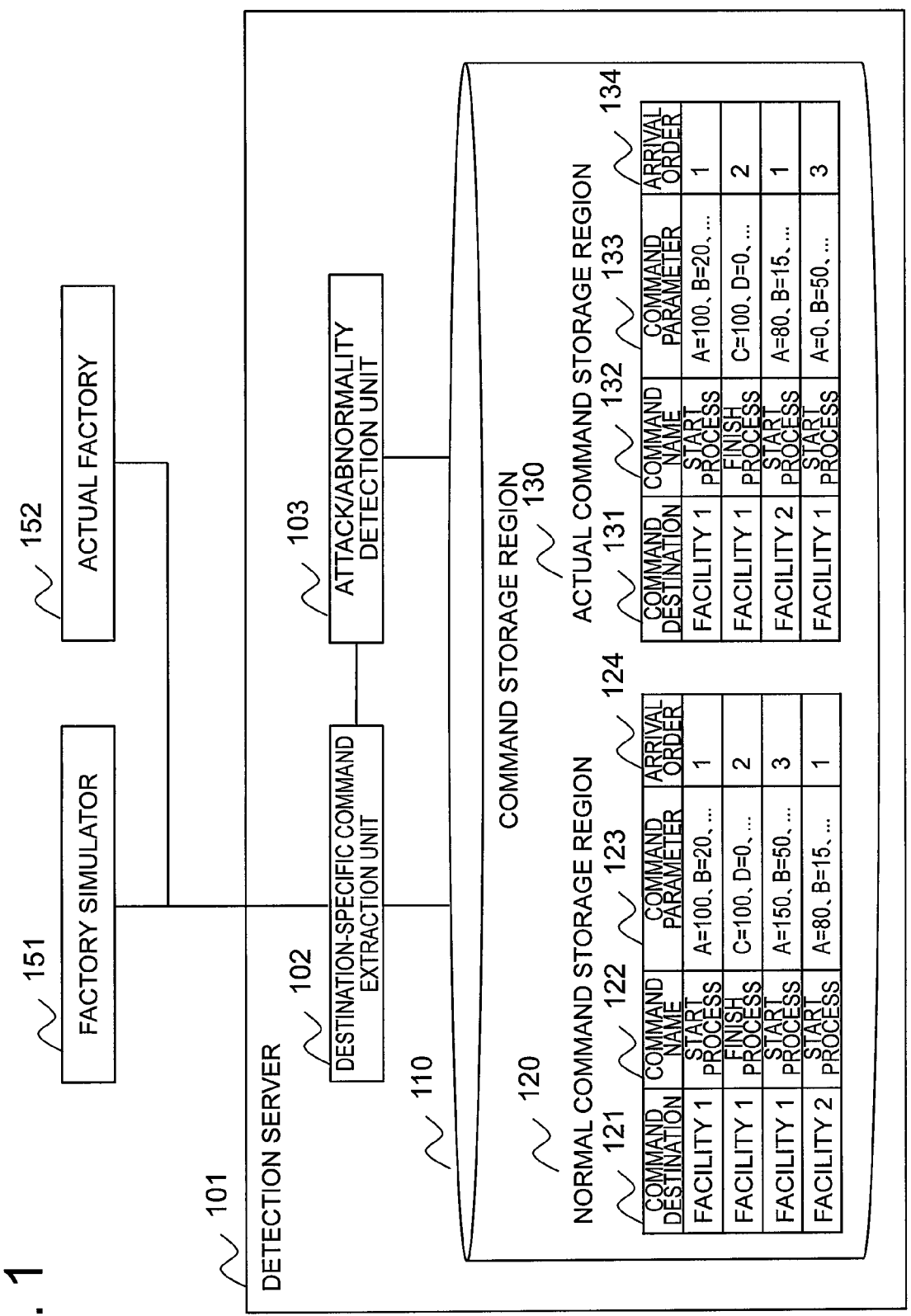
FIG. 1 is a configuration diagram for illustrating a detection server in a first embodiment of the present invention.

FIG. 1 is a configuration diagram for illustrating a detection server 101 in a first embodiment of the present invention. The detection server 101 corresponds to a specific example of the attack/abnormality detection device.

The detection server 101 includes a destination-specific command extraction unit 102, an attack/abnormality detection unit 103, and a command storage region 110. The command storage region 110 includes a normal command storage region 120 and an actual command storage region 130. Then, the command storage region 110 stores information held by the detection server 101.

The normal command storage region 120 stores, for example, information illustrated in FIG. 1. That is, the normal command storage region 120 in the first embodiment includes a command destination 121, a command name 122, a command parameter 123, and an arrival order 124.

The actual command storage region 130 stores, for example, information illustrated in FIG. 1. That is, the actual command storage region 130 in the first embodiment includes a command destination 131, a command name 132, a command parameter 133, and an arrival order 134.

A factory simulator 151 corresponds to an example of the simulation device. An actual factory 152 corresponds to an example of the actual factory.

Figure 2:
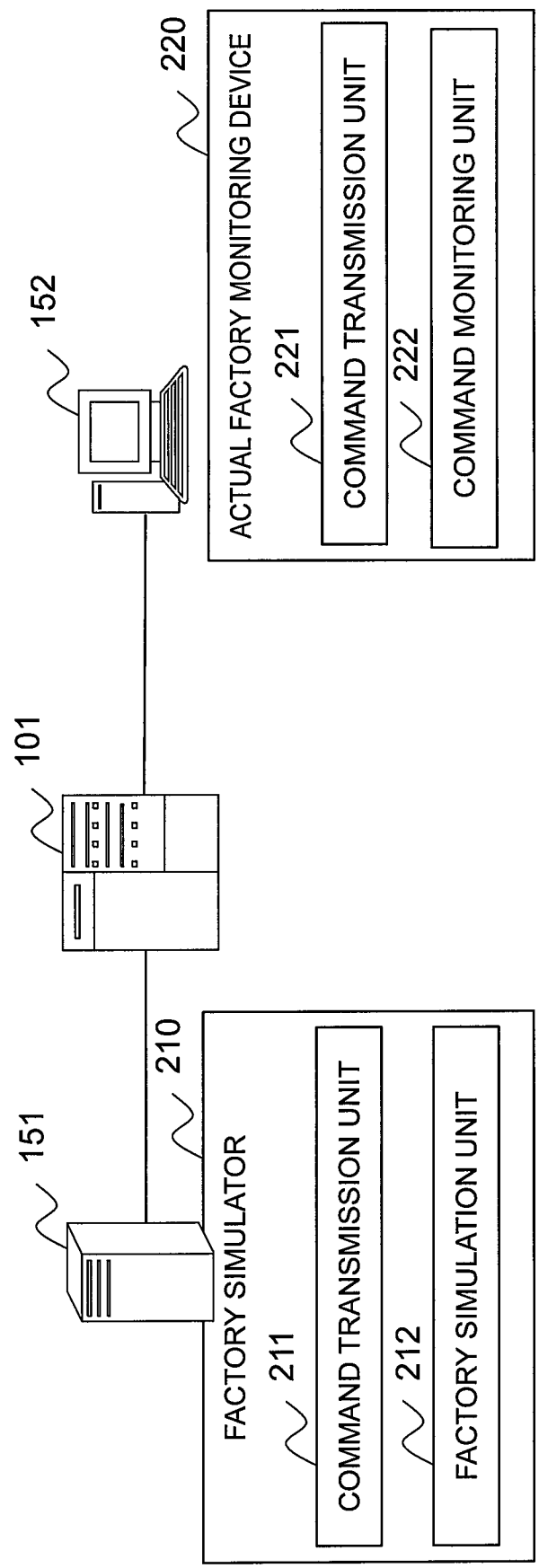
FIG. 2 is a diagram for illustrating a network configuration of the detection server, a factory simulator, and an actual factory in the first embodiment of the present invention.

FIG. 2 is a diagram for illustrating a network configuration of the detection server 101, the factory simulator 151, and the actual factory 152 in the first embodiment of the present invention. The factory simulator 151 includes a factory simulator 210 configured to implement simulation and transmit a result. The factory simulator 210 includes a command transmission unit 211 and a factory simulation unit 212.

The actual factory 152 includes an actual factory monitoring device 220 configured to monitor a manufacturing command in the factory and transmit a result. The actual factory monitoring device 220 includes a command transmission unit 221 and a command monitoring unit 222.

The detection server 101 may be configured to have the plurality of factory simulators 151 and the plurality of actual factories 152 connected thereto. Further, the factory simulator 151 connected to the detection server 101 may have a network configuration including a plurality of layers of the plurality of factory simulators 151. Similarly, the actual factory 152 may have a network configuration including a plurality of layers of the plurality of actual factories 152.

The above-mentioned detection server 101, the factory simulator 210, and the actual factory monitoring device 220 are computers, and each component of a data management device can execute processing by a program. Further, the program can be stored in a storage medium to be read from the storage medium by the computer.

Figure 3:
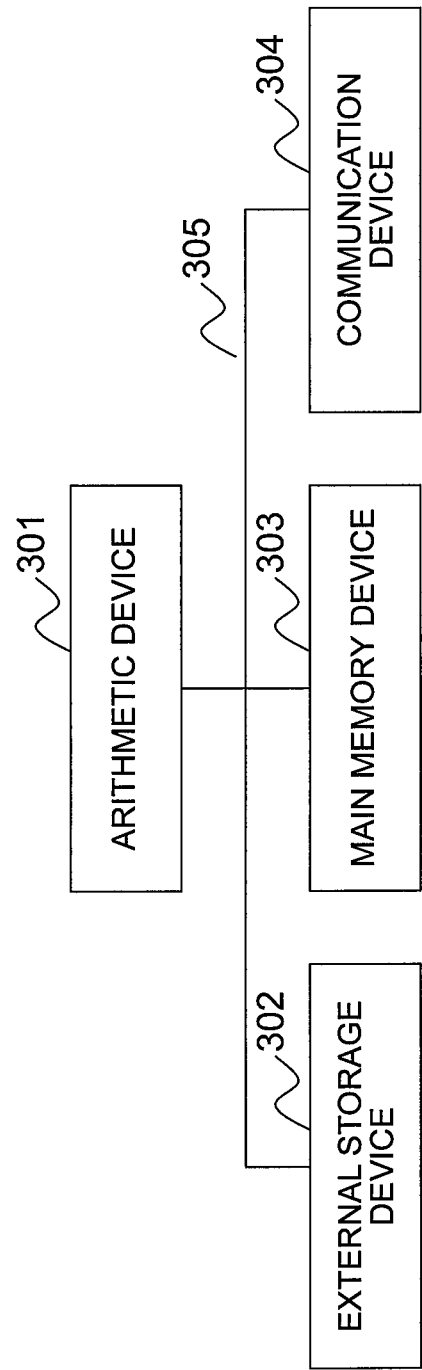
FIG. 3 is a diagram for illustrating an example of a hardware configuration of each of the detection server, the factory simulator, and an actual factory monitoring device in the first embodiment of the present invention.

FIG. 3 is a diagram for illustrating an example of a hardware configuration of each of the detection server 101, the factory simulator 210, and the actual factory monitoring device 220 in the first embodiment of the present invention. In FIG. 3, an arithmetic device 301, an external storage device 302, a main memory device 303, and a communication device 304 are connected to one another via a bus 305.

The arithmetic device 301 is a central processing unit (CPU) configured to execute a program. The external storage device 302 is, for example, a read only memory (ROM) or a hard disk drive.

The main memory device 303 is generally a random access memory (RAM). The communication device 304 is generally a communication card adapted for the Ethernet (trademark).

Programs are generally stored in the external storage device 302, and are sequentially read by the arithmetic device 301, and processing is executed under a state in which those programs are loaded in the main memory device 303. Specific programs correspond to programs for implementing the functions illustrated as the destination-specific command extraction unit 102 and the attack/abnormality detection unit 103 in FIG. 1.

Further, the command storage region 110 illustrated in FIG. 1 is implemented by, for example, the external storage device 302.

Further, the external storage device 302 also stores an operating system (OS). At least a part of the OS is loaded into the main memory device 303, and the arithmetic device 301 executes the programs for implementing the functions of the destination-specific command extraction unit 102 and the attack/abnormality detection unit 103 illustrated in FIG. 1 while executing the OS.

Further, in the description of the first embodiment, each of information, data, a signal value, and a variable indicating a result of the processing is stored in the main memory device 303 as a file.

The configuration of FIG. 3 is merely an illustration of an example of the hardware configuration of each of the detection server 101, the factory simulator 210, and the actual factory monitoring device 220, and may be another configuration without being limited to the configuration illustrated in FIG. 3. For example, in the hardware configuration, a display and other output devices, or a mouse, keyboard, and other input devices may be further connected to the bus 305.

Now, a description is given of an operation of the detection server 101 in the first embodiment with reference to FIG. 1. Details of each operation are described later with reference to a flowchart illustrated in FIG. 4.

The destination-specific command extraction unit 102 receives a manufacturing command transmitted from the factory simulator 151. Then, the destination-specific command extraction unit 102 extracts a command destination, a command name, and a command parameter from the received manufacturing command, and assigns those pieces of data with an arrival order. After that, the destination-specific command extraction unit 102 stores a command destination 121, a command name 122, a command parameter 123, and an arrival order 124 into the normal command storage region 120.

Further, the destination-specific command extraction unit 102 receives a manufacturing command transmitted from the actual factory 152. Then, the destination-specific command extraction unit 102 extracts a command destination, a command name, and a command parameter from the received manufacturing command, and assigns those pieces of data with an arrival order. After that, the destination-specific command extraction unit 102 stores a command destination 131, a command name 132, a command parameter 133, and an arrival order 134 into the actual command storage region 130.

The attack/abnormality detection unit 103 acquires, from the normal command storage region 120 and the actual command storage region 130, a manufacturing command having the same command destination as that of the manufacturing command of the actual factory 152 received by the destination-specific command extraction unit 102.

Further, when a group of manufacturing commands acquired from the actual command storage region 130 is a subgroup of a group of manufacturing commands acquired from the normal command storage region 120, the attack/abnormality detection unit 103 determines the current status as being "normal", and otherwise, determines the current status as being "abnormal".

The result of determination may be stored in the actual command storage region 130, or may be notified of through, for example, transmission to another device.

Next, a description is given of a data structure in the first embodiment.

The normal command storage region 120 of FIG. 1 is a table for showing an example of a storage format of a normal command. The command destination 121 is a unique identifier for identifying a destination of a manufacturing command. The command name 122 is a unique identifier for identifying a type of the manufacturing command. The command parameter 123 is a region for storing one or a plurality of parameters such as a numerical value, a character string, or a binary value, which are required for executing the manufacturing command.

The arrival order 124 is a region for storing the order of arrival of manufacturing commands by destination. When information enabling the order to be identified, for example, a time, is assigned to the manufacturing command, the information may be used instead of the arrival order 124.

The actual command storage region 130 of FIG. 1 is a table for showing an example of a storage format of an actual command. The command destination 131 is a unique identifier for identifying a destination of a manufacturing command. The command name 132 is a unique identifier for identifying a type of the manufacturing command. The command parameter 133 is a region for storing one or a plurality of parameters such as a numerical value, a character string, or a binary value, which are required for executing the manufacturing command.

The arrival order 134 is a region for storing the order of arrival of manufacturing commands by destination. When information enabling the order to be identified, for example, such as a time, is assigned to the manufacturing command, the information may be used instead of the arrival order 134. Further, a region for storing the result of determining "normality" or "attack/abnormality" of the manufacturing command may be added.

Figure 4:
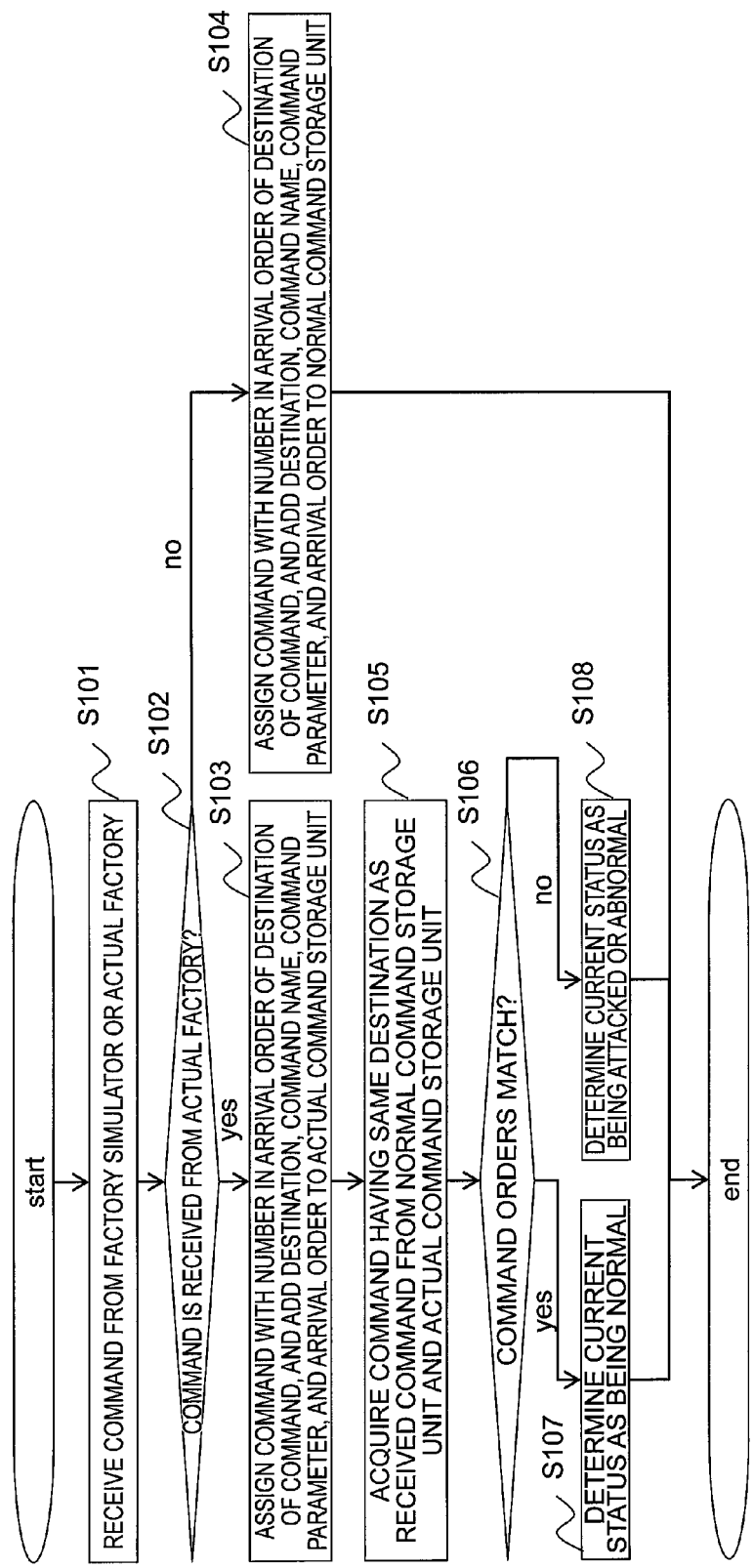
FIG. 4 is a flowchart for illustrating a series of operations of attack/abnormality detection processing to be executed by the detection server in the first embodiment of the present invention.

FIG. 4 is a flowchart for illustrating a series of operations of attack/abnormality detection processing to be executed by the detection server 101 in the first embodiment of the present invention. Now, a description is given of the attack/abnormality detection processing to be executed by the destination-specific command extraction unit 102 and the attack/abnormality detection unit 103 in the detection server 101 with reference to the flowchart illustrated in FIG. 4.

It is assumed in the series of processing steps of FIG. 4 that, when the operation of the actual factory 152 is normal, a manufacturing command having the same command destination and arrival order from the factory simulator 151 always arrives before the manufacturing command from the actual factory 152, and is stored in the normal command storage region 120 before the manufacturing command from the actual factory 152.

In Step S101, the destination-specific command extraction unit 102 receives a manufacturing command from the factory simulator 151 or the actual factory 152.

Next, in Step S102, the destination-specific command extraction unit 102 interprets the transmission source of the received manufacturing command. Then, when the transmission source of the manufacturing command is the actual factory 152, the destination-specific command extraction unit 102 advances the processing to Step S103, or when the transmission source of the manufacturing command is the factory simulator 151, the destination-specific command extraction unit 102 advances the processing to Step S104.

When the processing proceeds to Step S103, the destination-specific command extraction unit 102 assigns the manufacturing command with a number in arrival order of the destination of the manufacturing command, and adds the command destination, the command name, the command parameter, and the arrival order to the actual command storage region 130. After that, the processing proceeds to Step S105.

Meanwhile, when the destination-specific command extraction unit 102 proceeds to Step S104, the destination-specific command extraction unit 102 assigns the manufacturing command with a number in arrival order of the destination of the manufacturing command, and adds the command destination, the command name, the command parameter, and the arrival order to the normal command storage region 120.

When the processing proceeds to Step S105 from Step S103, the attack/abnormality detection unit 103 acquires a group of normal commands and a group of actual commands, which are a group of manufacturing commands having the same destination as that of the manufacturing command received from the actual factory 152 in previous Step S101, from the normal command storage region 120 and the actual command storage region 130.

Next, in Step S106, the attack/abnormality detection unit 103 compares the group of normal commands with the group of actual commands acquired in Step S105. Then, when the group of normal commands and the group of actual commands have the same order of manufacturing commands, the attack/abnormality detection unit 103 determines the current status as being normal, and the processing proceeds to Step S107. On the contrary, when the group of normal commands and the group of actual commands do not have the same order of manufacturing commands, the attack/abnormality detection unit 103 determines the current status as being attacked or abnormal, and the processing proceeds to Step S108.

The phrase "have the same order of manufacturing commands" refers to the fact that the group of normal commands and the group of actual commands have the same command destination, command name, and command parameter for manufacturing commands with the same arrival order.

At this time, even in a case where there is a manufacturing command that exists in the arrival order of the group of normal commands but does not exist in the arrival order of the group of actual commands, when the group of normal commands and the group of actual commands have the same order of manufacturing commands, the attack/abnormality detection unit 103 determines the current status as being normal.

On the contrary, in a case where there is a manufacturing command that exists in the arrival order of the group of actual commands but does not exist in the arrival order of the group of normal commands, the attack/abnormality detection unit 103 determines the current status as being attacked or abnormal even when the group of normal commands and the group of actual commands have the same order of manufacturing commands.

Figure 5:
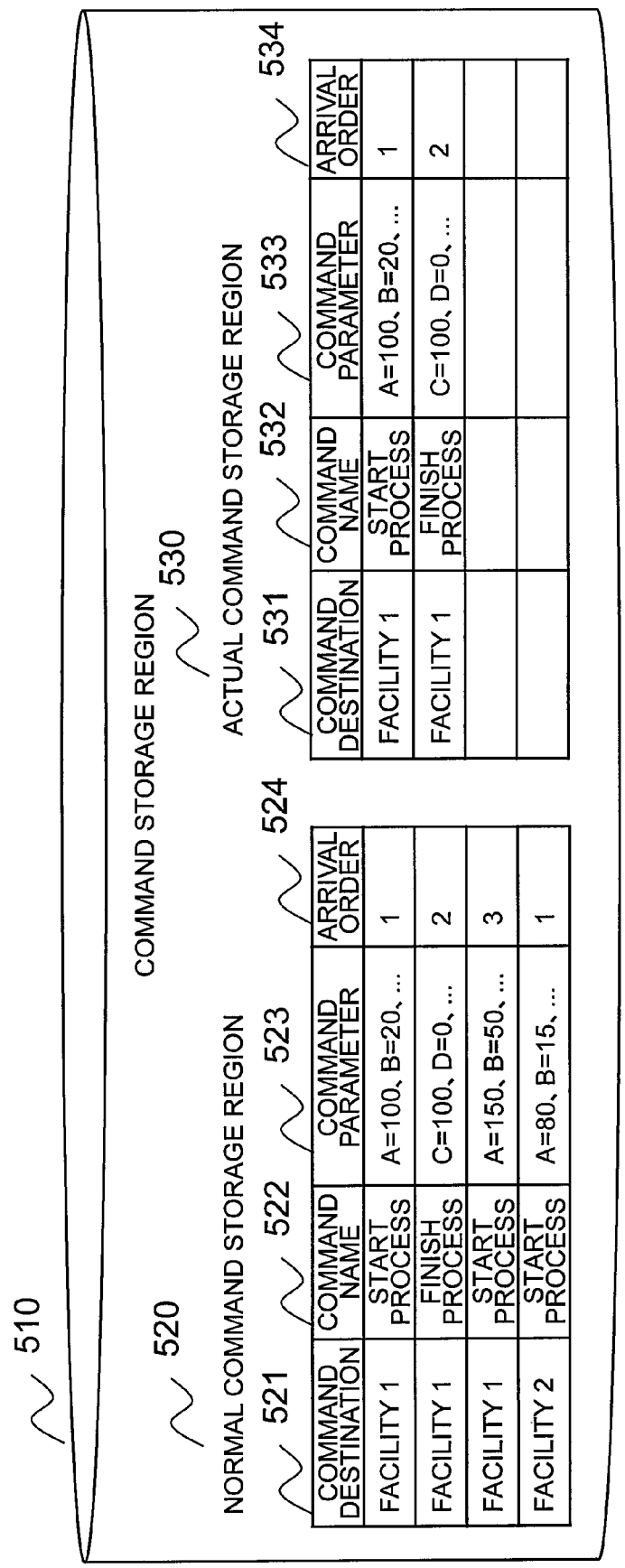
FIG. 5 is a diagram for illustrating how a command storage region is stored as a specific example of the command storage region in the first embodiment of the present invention.
Figure 6:
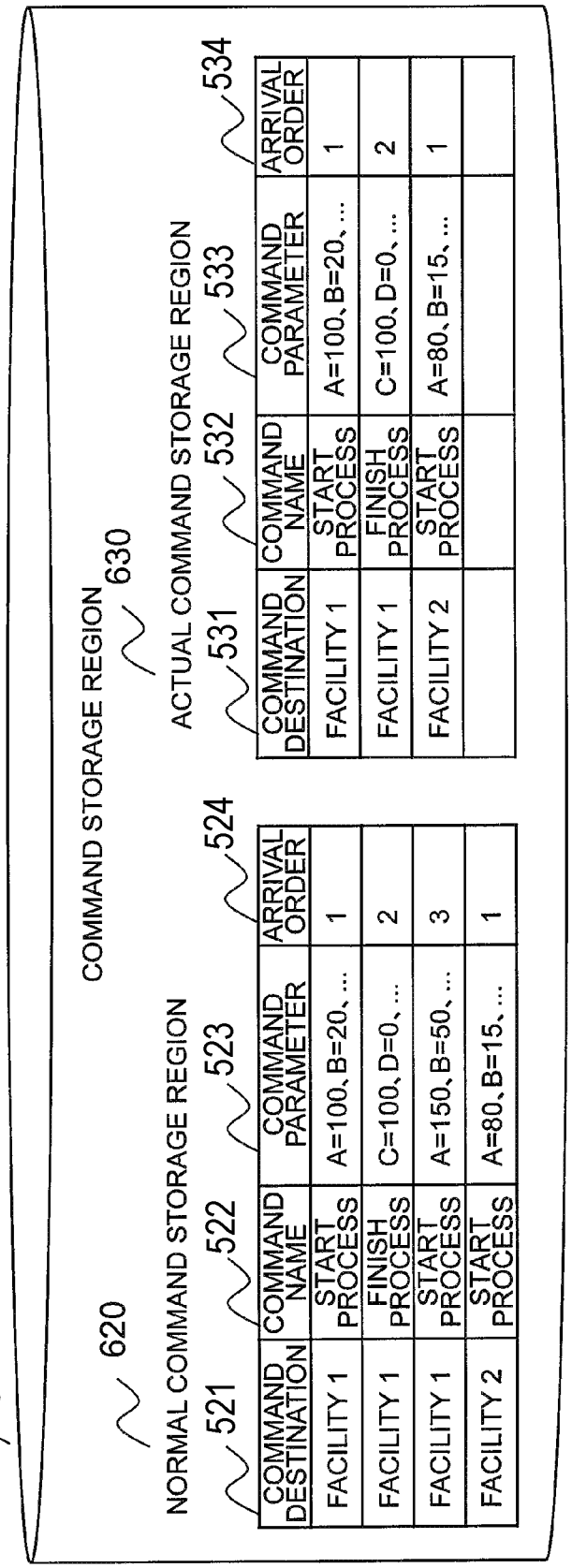
FIG. 6 is a diagram for illustrating how an updated command storage region is stored after reception of an additional manufacturing command from the actual factory under a state of the example of the command storage region illustrated in FIG. 5, as a specific example of the command storage region in the first embodiment of the present invention.
Figure 7:
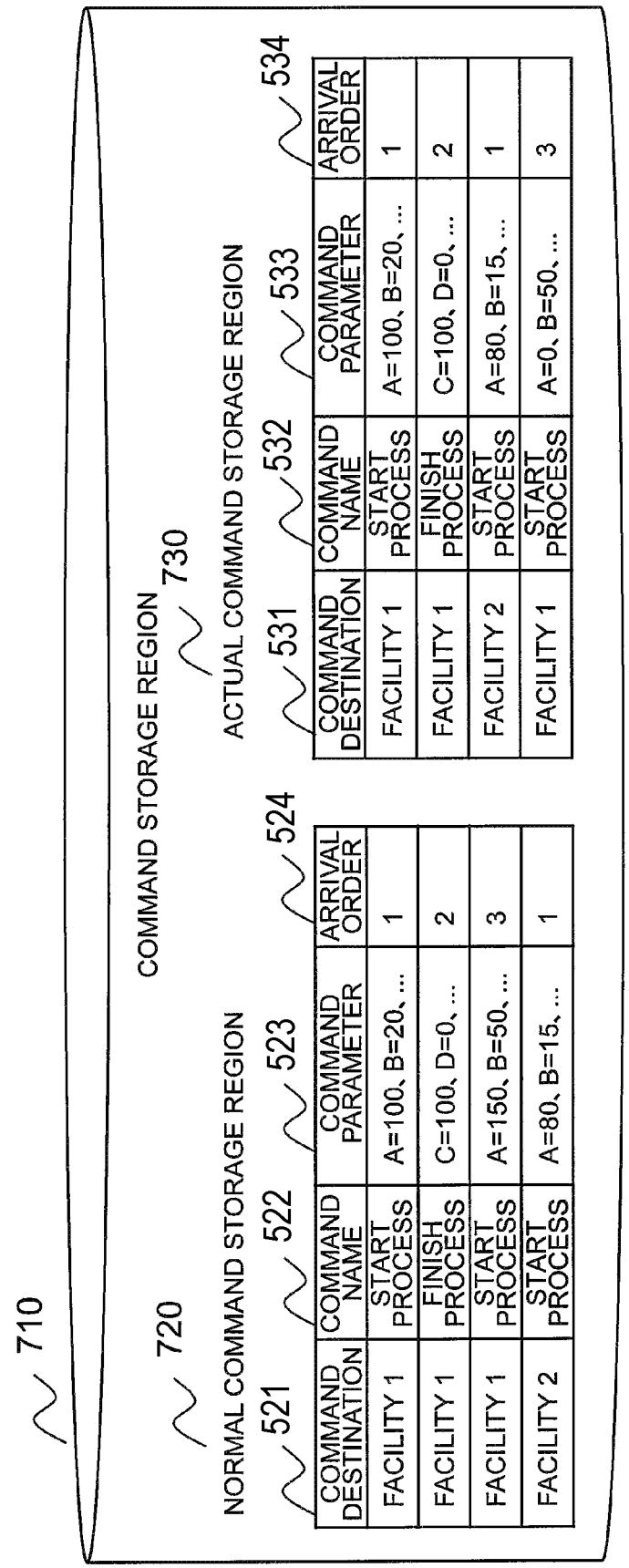
FIG. 7 is a diagram for illustrating how an updated command storage region is stored after reception of an additional manufacturing command from the actual factory under a state of the example of the command storage region illustrated in FIG. 6, as a specific example of the command storage region in the first embodiment of the present invention.

Now, a specific description is given of operation processing of detecting attack/abnormality in the first embodiment by using examples of command storage regions of FIG. 5, FIG. 6, and FIG. 7.

FIG. 5 is a diagram for illustrating how a command storage region 510 is stored as a specific example of the command storage region 110 in the first embodiment of the present invention. First, a description is given of an example of operation processing of detecting attack/abnormality for the command storage region 510 illustrated in FIG. 5.

It is assumed that a normal command storage region 520 stores a result of the destination-specific command extraction unit 102 interpreting a manufacturing command transmitted from the factory simulator 151, extracting a command destination 521, a command name 522, and a command parameter 523, and assigning those pieces of data with an arrival order 524.

Meanwhile, it is assumed that an actual command storage region 530 stores a result of the destination-specific command extraction unit 102 interpreting a manufacturing command transmitted from the actual factory 152, extracting a command destination 531, a command name 532, and a command parameter 533, and assigning those pieces of data with an arrival order 534.

Now, a description is given of an operation based on an example of a normal state in which four manufacturing commands are stored in the normal command storage region 520 and two manufacturing commands are stored in the actual command storage region 530.

FIG. 6 is a diagram for illustrating, as a specific example of the command storage region 110 in the first embodiment of the present invention, how an updated command storage region 610 is stored after reception of an additional manufacturing command from the actual factory 152 under a state of the example of the command storage region 510 illustrated in FIG. 5.

More specifically, the example of the command storage region 610 corresponds to a state in which the destination-specific command extraction unit 102 receives one additional manufacturing command "(command destination=facility 2, command name=start process, command parameter=A=80, B=15, . . . , arrival order=1)" from the actual factory 152 and stores the additional manufacturing command in an actual command storage region 630 under the state of the example of the command storage region 510 illustrated in FIG. 5.

Then, on the basis of the above-mentioned additional manufacturing command, the attack/abnormality detection unit 103 acquires a group of normal commands having the command destination=facility 2 from a normal command storage region 620, and acquires a group of actual commands having the command destination=facility 2 from the actual command storage region 630.

As a result, the attack/abnormality detection unit 103 acquires "(command destination=facility 2, command name=start process, command parameter=A=80, B=15, . . . , arrival order=1)" as the group of normal commands, and acquires "(command destination=facility 2, command name=start process, command parameter=A=80, B=15, . . . , arrival order=1)" as the group of actual commands.

At this time, the attack/abnormality detection unit 103 compares the acquired group of normal commands and group of actual commands with each other. Then, as a result of comparison, all the command destinations, command names, command parameters, and arrival orders match each other, and thus the attack/abnormality detection unit 103 interprets that the group of normal commands and the group of actual commands have the same order of manufacturing commands, and determines the current status as being normal.

Next, FIG. 7 is a diagram for illustrating, as a specific example of the command storage region 110 in the first embodiment of the present invention, how an updated command storage region 710 is stored after reception of an additional manufacturing command from the actual factory 152 under a state of the example of the command storage region 610 illustrated in FIG. 6.

More specifically, the example of the command storage region 710 corresponds to a state in which the destination-specific command extraction unit 102 receives one additional manufacturing command "(command destination=facility 1, command name=start process, command parameter=A=0, B=50, . . . , arrival order=3)" from the actual factory 152 and stores the additional manufacturing command in an actual command storage region 730 under the state of the example of the command storage region 610 illustrated in FIG. 6.

Then, on the basis of the above-mentioned additional manufacturing command, the attack/abnormality detection unit 103 acquires a group of normal commands having the command destination=facility 1 from a normal command storage region 720, and acquires a group of actual commands having the command destination=facility 1 from the actual command storage region 730.

As a result, the attack/abnormality detection unit 103 acquires "(command destination=facility 1, command name=start process, command parameter=A=100, B=20, . . . , arrival order=1), (command destination=facility 1, command name=finish process, command parameter=C=100, D=0, . . . , arrival order=2), and (command destination=facility 1, command name=start process, command parameter=A=150, B=50, . . . , arrival order=3)" as the group of normal commands.

Similarly, the attack/abnormality detection unit 103 acquires "(command destination=facility 1, command name=start process, command parameter=A=100, B=20, . . . , arrival order=1), (command destination=facility 1, command name=finish process, command parameter=C=100, D=0, . . . , arrival order=2), and (command destination=facility 1, command name=start process, command parameter=A=0, B=50, . . . , arrival order=3)" as the group of actual commands.

At this time, the attack/abnormality detection unit 103 compares the acquired group of normal commands and group of actual commands with each other. Then, as a result of comparison, all the command destinations, command names, command parameters, and arrival orders match each other for the manufacturing commands having the arrival orders 1 and 2, but command parameters do not match each other for the manufacturing commands having the arrival order 3, and thus the attack/abnormality detection unit 103 interprets that the group of normal commands and the group of actual commands do not have the same order of manufacturing commands, and determines the current status as being attacked or abnormal.

In this manner, in the first embodiment, there is provided a processing configuration in which a manufacturing command extracted by the destination-specific command extraction unit 102 is stored into the normal command storage region 120 and the actual command storage region 130 of the command storage region 110 managed by the detection server 101, the group of normal commands and the group of actual commands are extracted in relation to the manufacturing command additionally received from the actual factory 152 by the attack/abnormality detection unit 103, and the orders of those groups of normal commands and actual commands are compared with each other, to thereby detect an attack/abnormality.

Hitherto, the group of normal commands and the group of actual commands have been required to be managed based on a product ID, and it has been difficult to handle a manufacturing command that is not assigned with a product ID. In contrast, with the processing configuration in the first embodiment, even when there is a manufacturing command that is not assigned with a product ID, it is possible to obtain a significant effect of being able to detect an attack/abnormality for a manufacturing command in the actual factory by using the destination of the manufacturing command, which is always assigned.

Second Embodiment

In a second embodiment of the present invention, a description is given of a case of implementing a detection server capable of detecting an attack/abnormality of a manufacturing command with a specific destination being discarded by using additional information, for example, a product ID, in addition to the destination of the manufacturing command.

Figure 8:
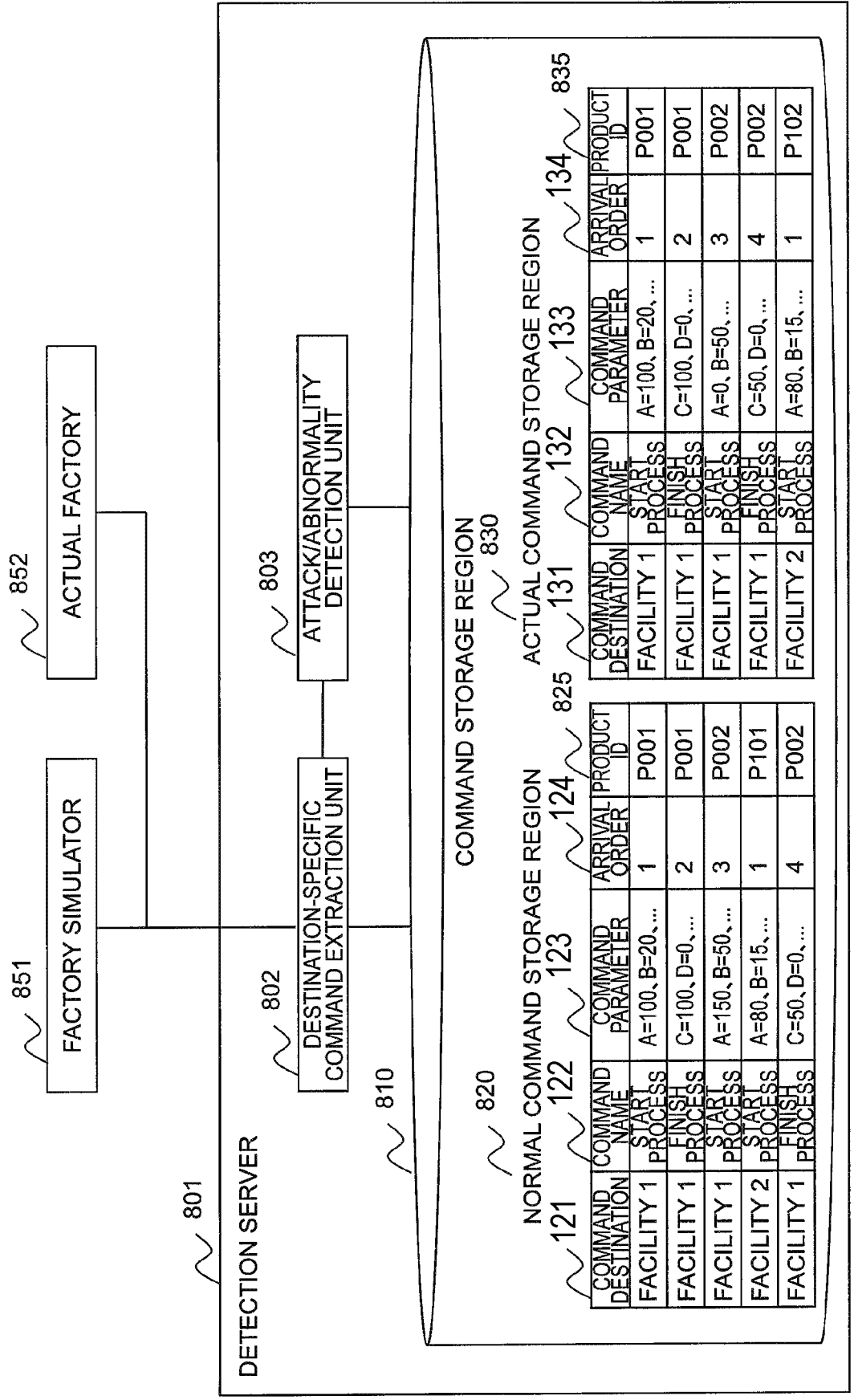
FIG. 8 is a configuration diagram for illustrating a detection server in a second embodiment of the present invention.

FIG. 8 is a configuration diagram for illustrating a detection server 801 in a second embodiment of the present invention. The detection server 801 corresponds to a specific example of the attack/abnormality detection device.

Compared with the detection server 101 of FIG. 1, the detection server 801 is different from the detection server 101 in that a product ID (825, 835) is further added to data items stored by a normal command storage region 820 and an actual command storage region 830. Now, the following description is given by mainly focusing on this difference.

The product ID is an example of information enabling a target to which a manufacturing command is applied to be identified, other than the command destination. Thus, information other than the product ID may be used as the additional information as long as the information satisfies a condition of the information enabling a target to which a manufacturing command is applied to be identified, other than the command destination.

Figure 9:
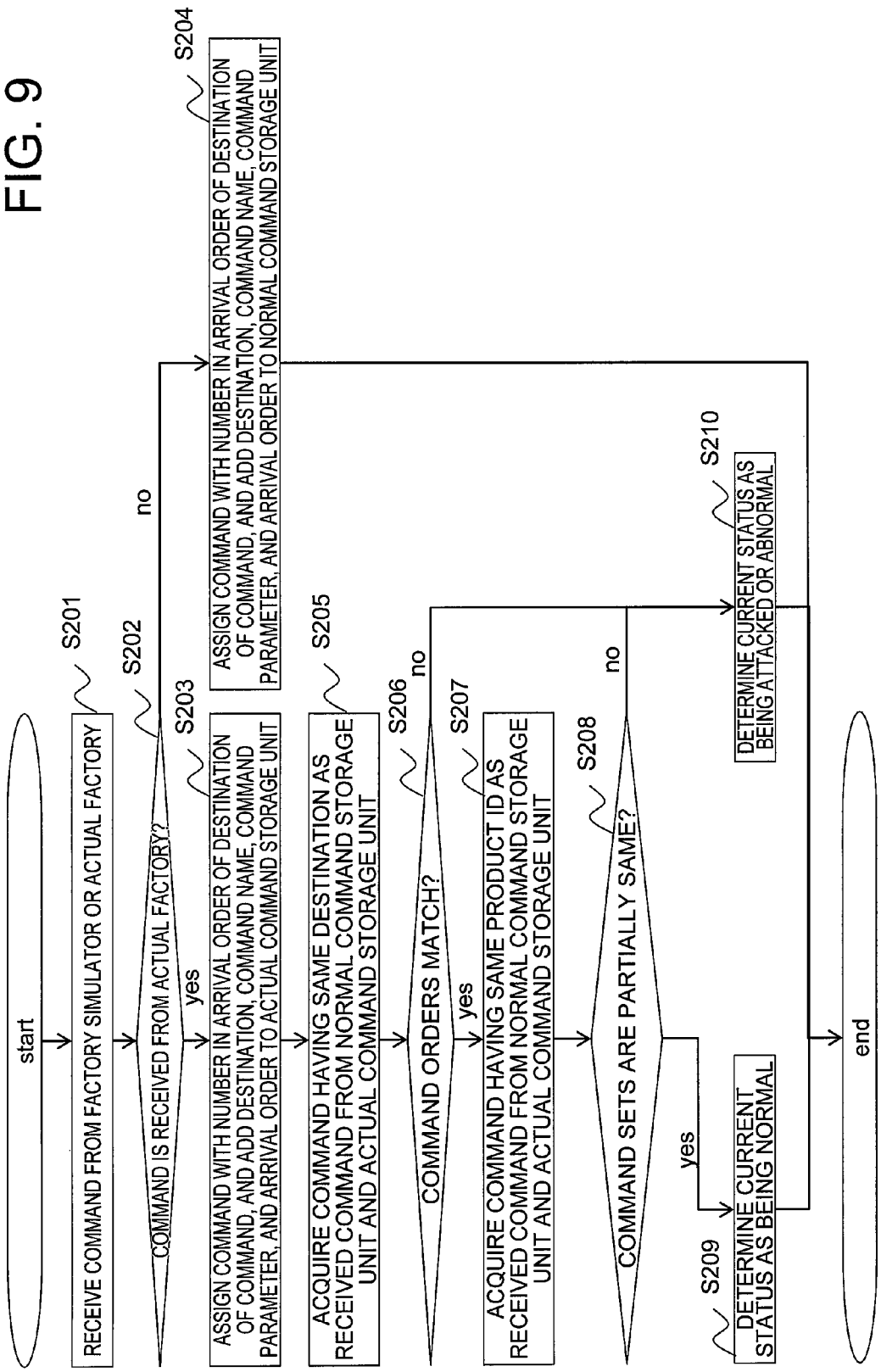
FIG. 9 is a flowchart for illustrating a series of operations of attack/abnormality detection processing to be executed by the detection server in the second embodiment of the present invention.

FIG. 9 is a flowchart for illustrating a series of operations of attack/abnormality detection processing to be executed by the detection server 801 in the second embodiment of the present invention. Now, a description is given of the attack/abnormality detection processing to be executed by a destination-specific command extraction unit 802 and an attack/abnormality detection unit 803 in the detection server 801 with reference to the flowchart illustrated in FIG. 9.

In Step S201, the destination-specific command extraction unit 802 receives a manufacturing command from a factory simulator 851 or an actual factory 852.

Next, in Step S202, the destination-specific command extraction unit 802 interprets the transmission source of the received manufacturing command. Then, when the transmission source of the manufacturing command is the actual factory 852, the processing proceeds to Step S203, or when the transmission source of the manufacturing command is the factory simulator 851, the to be identified proceeds to Step S204.

When the processing proceeds to Step S203, the destination-specific command extraction unit 802 assigns the manufacturing command with a number in arrival order of the destination of the manufacturing command, and adds the command destination, the command name, the command parameter, the arrival order, and the product ID to the actual command storage region 830. After that, the processing proceeds to Step S205.

Meanwhile, when the processing proceeds to Step S204, the destination-specific command extraction unit 802 assigns the manufacturing command with a number in arrival order of the destination of the manufacturing command, and adds the command destination, the command name, the command parameter, the arrival order, and the product ID to the normal command storage region 820.

When the processing proceeds to Step S205 from Step S203, the attack/abnormality detection unit 803 acquires a group of normal commands and a group of actual commands, which are a group of manufacturing commands having the same destination as that of the manufacturing command received from the actual factory 852 in previous Step S201, from the normal command storage region 820 and the actual command storage region 830.

Next, in Step S206, the attack/abnormality detection unit 803 compares the group of normal commands with the group of actual commands acquired in Step S205. Then, when the group of normal commands and the group of actual commands have the same order of manufacturing commands, the processing proceeds to Step S207. On the contrary, when the group of normal commands and the group of actual commands do not have the same order of manufacturing commands, the attack/abnormality detection unit 803 determines the current status as being attacked or abnormal, and the processing proceeds to Step S210.

The phrase "have the same order of manufacturing commands" refers to the fact that the group of normal commands and the group of actual commands have the same command destination, command name, and command parameter for manufacturing commands with the same arrival order.

At this time, even in a case where there is a manufacturing command that exists in the arrival order of the group of normal commands but does not exist in the arrival order of the group of actual commands, when the group of normal commands and the group of actual commands have the same order of manufacturing commands, the attack/abnormality detection unit 803 determines the current status as being normal.

On the contrary, in a case where there is a manufacturing command that exists in the arrival order of the group of actual commands but does not exist in the arrival order of the group of normal commands, the attack/abnormality detection unit 803 determines the current status as being attacked or abnormal even when the group of normal commands and the group of actual commands have the same order of manufacturing commands.

When the processing proceeds to Step S207, the attack/abnormality detection unit 803 acquires a group of normal commands and a group of actual commands, which are a group of manufacturing commands having the same product ID as that of the manufacturing command received from the actual factory 852 in previous Step S201, from the normal command storage region 820 and the actual command storage region 830.

Next, in Step S208, the attack/abnormality detection unit 803 compares the group of normal commands with the group of actual commands acquired in Step S207. When the group of normal commands and the group of actual commands have the same set of manufacturing commands, the attack/abnormality detection unit 803 determines the current status as being normal, and the processing proceeds to Step S209. On the contrary, when the group of normal commands and the group of actual commands do not have the same set of manufacturing commands, the attack/abnormality detection unit 803 determines the current status as being attacked or abnormal, and the processing proceeds to Step S210.

The phrase "have the same set of manufacturing commands" refers to the fact that the group of normal commands and the group of actual commands have the same command destination, command name, and command parameter for manufacturing commands with the same product ID.

At this time, even in a case where there is a manufacturing command that exists in the product ID of the group of normal commands but does not exist in the product ID of the group of actual commands, when the group of normal commands and the group of actual commands have the same set of manufacturing commands, the attack/abnormality detection unit 803 determines the current status as being normal.

On the contrary, in a case where there is a manufacturing command that exists in the product ID of the group of actual commands but does not exist in the product ID of the group of normal commands, the attack/abnormality detection unit 803 determines the current status as being attacked or abnormal even when the group of normal commands and the group of actual commands have the same set of manufacturing commands.

Figure 10:
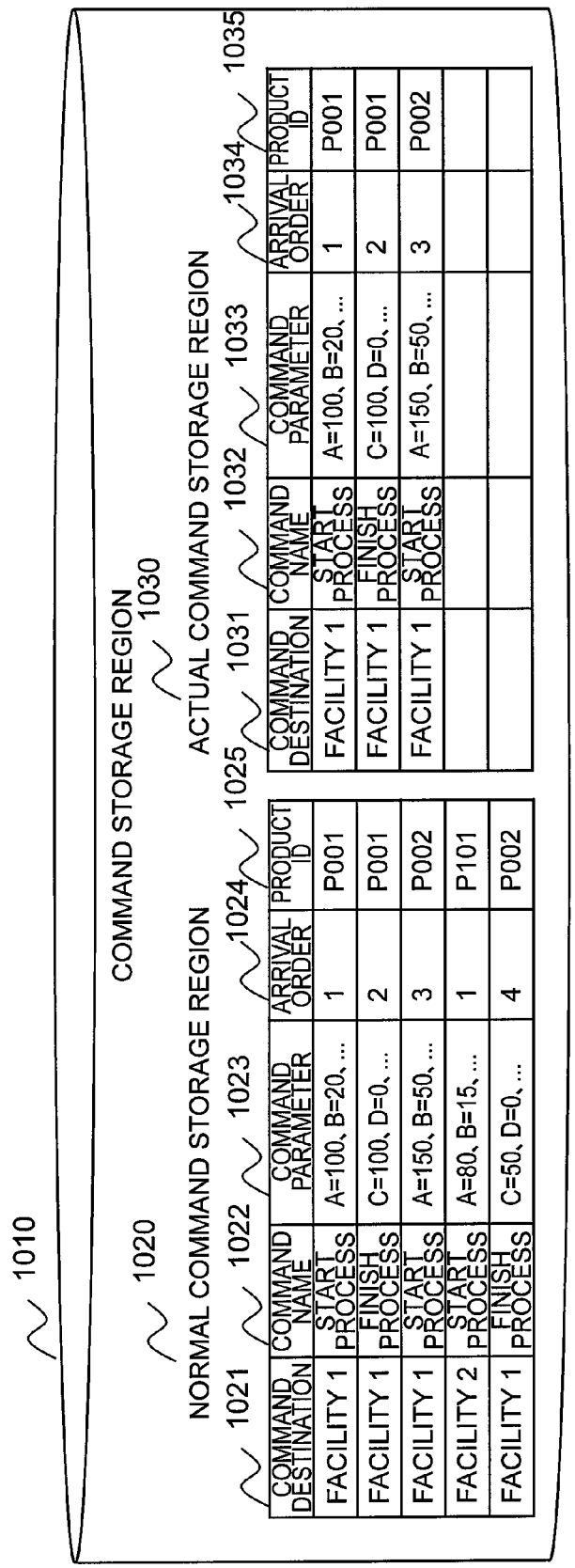
FIG. 10 is a diagram for illustrating how a command storage region is stored as a specific example of the command storage region in the second embodiment of the present invention.
Figure 11:
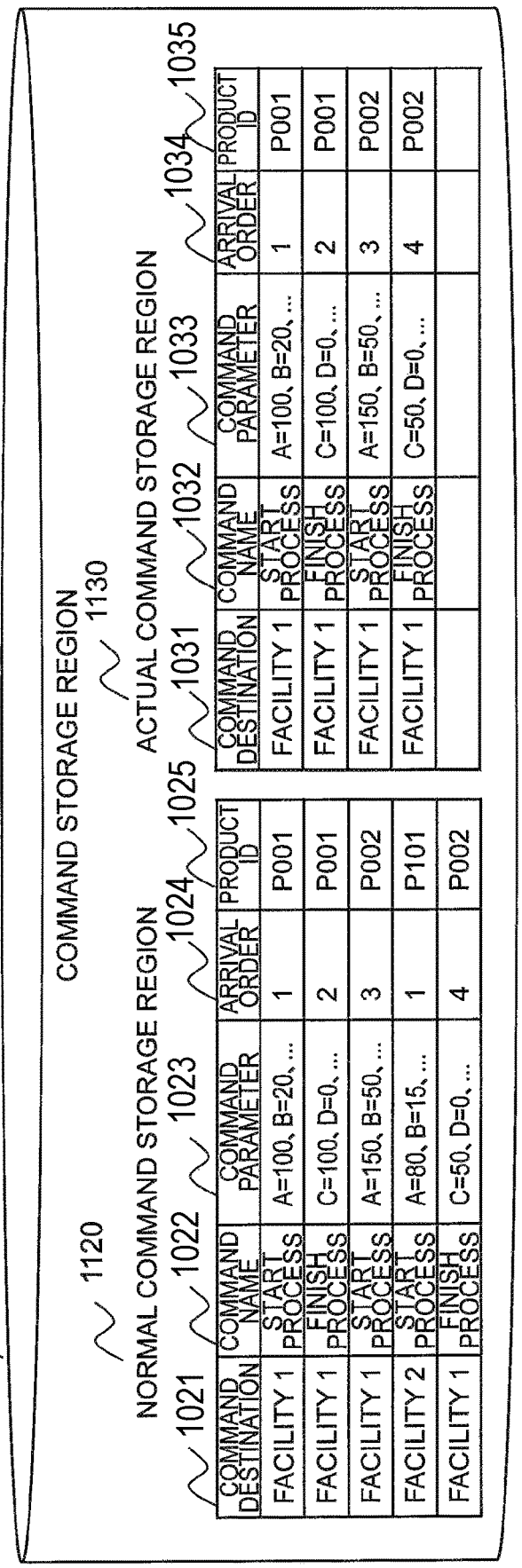
FIG. 11 is a diagram for illustrating how an updated command storage region is stored after reception of an additional manufacturing command from the actual factory under a state of the example of the command storage region illustrated in FIG. 10, as a specific example of the command storage region in the second embodiment of the present invention.
Figure 12:
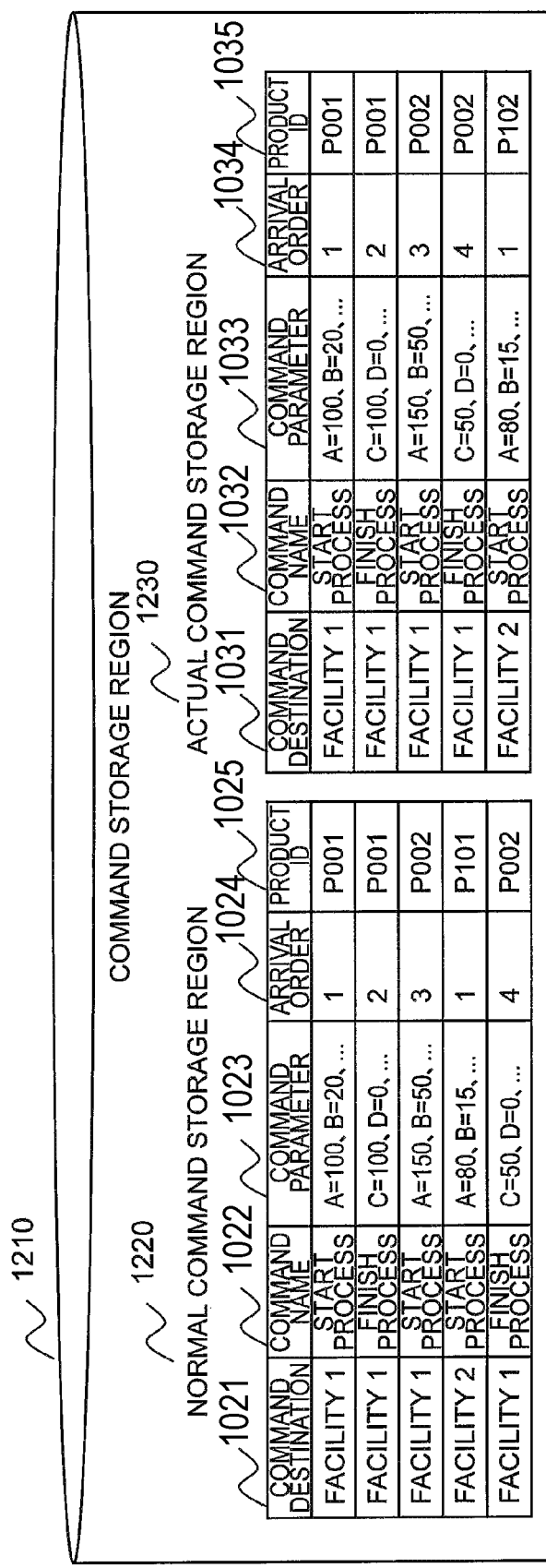
FIG. 12 is a diagram for illustrating how an updated command storage region is stored after reception of an additional manufacturing command from the actual factory under a state of the example of the command storage region illustrated in FIG. 11, as a specific example of the command storage region in the second embodiment of the present invention.

Now, a specific description is given of operation processing of detecting attack/abnormality in the second embodiment by using examples of command storage regions of FIG. 10, FIG. 11, and FIG. 12.

FIG. 10 is a diagram for illustrating how a command storage region 1010 is stored as a specific example of the command storage region 810 in the second embodiment of the present invention. First, a description is given of an example of operation processing of detecting attack/abnormality for the command storage region 1010 illustrated in FIG. 10.

It is assumed that a normal command storage region 1020 stores a result of the destination-specific command extraction unit 802 interpreting a manufacturing command transmitted from the factory simulator 851, extracting a command destination 1021, a command name 1022, a command parameter 1023, and a product ID 1025, and assigning those pieces of data with an arrival order 1024.

Meanwhile, it is assumed that an actual command storage region 1030 stores a result of the destination-specific command extraction unit 802 interpreting a manufacturing command transmitted from the actual factory 852, extracting a command destination 1031, a command name 1032, a command parameter 1033, and a product ID 1035, and assigning those pieces of data with an arrival order 1034.

Now, a description is given of an operation based on an example of a normal state in which five manufacturing commands are stored in the normal command storage region 1020 and three manufacturing commands are stored in the actual command storage region 1030.

FIG. 11 is a diagram for illustrating, as a specific example of the command storage region 1010 in the second embodiment of the present invention, how an updated command storage region 1110 is stored after reception of an additional manufacturing command from the actual factory 852 under a state of the example of the command storage region 1010 illustrated in FIG. 10.

More specifically, the example of the command storage region 1110 corresponds to a state in which the destination-specific command extraction unit 802 receives one additional manufacturing command "(command destination=facility 1, command name=finish process, commandparameter=C=50, D=0, . . . , arrival order=4, product ID=P002)" from the actual factory 852 and stores the additional manufacturing command in an actual command storage region 1130 under the state of the example of the command storage region 1010 illustrated in FIG. 10.

Then, on the basis of the above-mentioned additional manufacturing command, the attack/abnormality detection unit 803 acquires a group of normal commands having the command destination=facility 1 from a normal command storage region 1120, and acquires a group of actual commands having the command destination=facility 1 from the actual command storage region 1130.

As a result, the attack/abnormality detection unit 803 acquires "(command destination=facility 1, command name=start process, command parameter=A=100, B=20, . . . , arrival order=1), (command destination=facility 1, command name=finish process, command parameter=C=100, D=0, . . . , arrival order=2), (command destination=facility 1, command name=start process, command parameter=A=150, B=50, . . . , arrival order=3), (command destination=facility 1, command name=finish process, command parameter=C=50, D=0, . . . , arrival order=4)" as the group of normal commands.

Similarly, the attack/abnormality detection unit 803 acquires "(command destination=facility 1, command name=start process, command parameter=A=100, B=20, . . . , arrival order=1), (command destination=facility 1, command name=finish process, command parameter=C=100, D=0, . . . , arrival order=2), (command destination=facility 1, command name=start process, command parameter=A=150, B=50, . . . , arrival order=3), (command destination=facility 1, command name=finish process, command parameter=C=50, D=0, . . . , arrival order=4)" as the group of actual commands.

At this time, the attack/abnormality detection unit 803 compares the acquired group of normal commands and group of actual commands with each other. Then, as a result of comparison, all the command destinations, command names, command parameters, and arrival orders match each other, and thus the attack/abnormality detection unit 803 interprets that the group of normal commands and the group of actual commands have the same order of manufacturing commands.

Next, on the basis of the above-mentioned additional manufacturing command, the attack/abnormality detection unit 803 acquires the group of normal commands having the product ID=P002 from the normal command storage region 1120, and acquires the group of actual commands having the product ID=P002 from the actual command storage region 1130.

As a result, the attack/abnormality detection unit 803 acquires "(command destination=facility 1, command name=start process, command parameter=A=150, B=50, . . . , arrival order=3) and (command destination=facility 1, command name=finish process, command parameter=C=50, D=0, . . . , arrival order=4)" as the group of normal commands.

Similarly, the attack/abnormality detection unit 803 acquires "(command destination=facility 1, command name=start process, command parameter=A=150, B=50, . . . , arrival order=3) and (command destination=facility 1, command name=finish process, command parameter=C=50, D=0, . . . , arrival order=4)" as the group of actual commands.

At this time, the attack/abnormality detection unit 803 compares the acquired group of normal commands and group of actual commands with each other. Then, as a result of comparison, all the command destinations, command names, and command parameters match each other, and thus the attack/abnormality detection unit 803 interprets that the sets of manufacturing commands match each other.

Next, FIG. 12 is a diagram for illustrating, as a specific example of the command storage region 1010 in the second embodiment of the present invention, how an updated command storage region 1210 is stored after reception of an additional manufacturing command from the actual factory 852 under a state of the example of the command storage region 1110 illustrated in FIG. 11.

More specifically, the example of the command storage region 1210 corresponds to a state in which the destination-specific command extraction unit 802 receives one additional manufacturing command "(command destination=facility 2, command name=start process, command parameter=A=80, B=15, . . . , arrival order=1, product ID=P102)" from the actual factory 852 and stores the additional manufacturing command in an actual command storage region 1230 under the state of the example of the command storage region 1110 illustrated in FIG. 11.

Then, on the basis of the above-mentioned additional manufacturing command, the attack/abnormality detection unit 803 acquires a group of normal commands having the command destination=facility 2 from a normal command storage region 1220, and acquires a group of actual commands having the command destination=facility 2 from the actual command storage region 1230.

As a result, the attack/abnormality detection unit 803 acquires "(command destination=facility 2, command name=start process, command parameter=A=80, B=15, . . . , arrival order=1)" as the group of normal commands.

Similarly, the attack/abnormality detection unit 803 acquires "(command destination=facility 2, command name=start process, command parameter=A=80, B=15, . . . , arrival order=1)" as the group of actual commands.

At this time, the attack/abnormality detection unit 803 compares the acquired group of normal commands and group of actual commands with each other. Then, as a result of comparison, all the command destinations, command names, command parameters, and the arrival orders match each other, and thus the attack/abnormality detection unit 803 interprets that the orders of manufacturing commands match each other.

Next, on the basis of the above-mentioned additional manufacturing command, the attack/abnormality detection unit 803 acquires the group of normal commands having the product ID=P102 from a normal command storage region 1220, and acquires the group of actual commands having the product ID=P102 from the actual command storage region 1230.

As a result, the attack/abnormality detection unit 803 acquires "empty set" as the group of normal commands. Similarly, the attack/abnormality detection unit 803 acquires "(command destination=facility 2, command name=start process, command parameter=A=80, B=15, . . . , arrival order=1, product ID=P102)" as the group of actual commands.

At this time, the attack/abnormality detection unit 803 compares the acquired group of normal commands and group of actual commands with each other. Then, as a result of comparison, the group of normal commands to be compared with the group of actual commands is an empty set, and thus the attack/abnormality detection unit 803 interprets that the sets of manufacturing commands do not match each other, and determines the current status as being attacked or abnormal.

In this manner, in the second embodiment, it is possible to obtain a significant effect of being able to detect an attack/abnormality for a specific manufacturing command in the actual factory by using a product ID in addition to the destination of the manufacturing command even when the destination of a specific manufacturing command is discarded.

Third Embodiment

In a third embodiment of the present invention, a description is given of a case of implementing a detection server capable of detecting an attack/abnormality of a manufacturing command with a specific destination and a specific product ID being discarded when additional information, for example, a product ID is used in addition to the destination of the manufacturing command.

Figure 13:
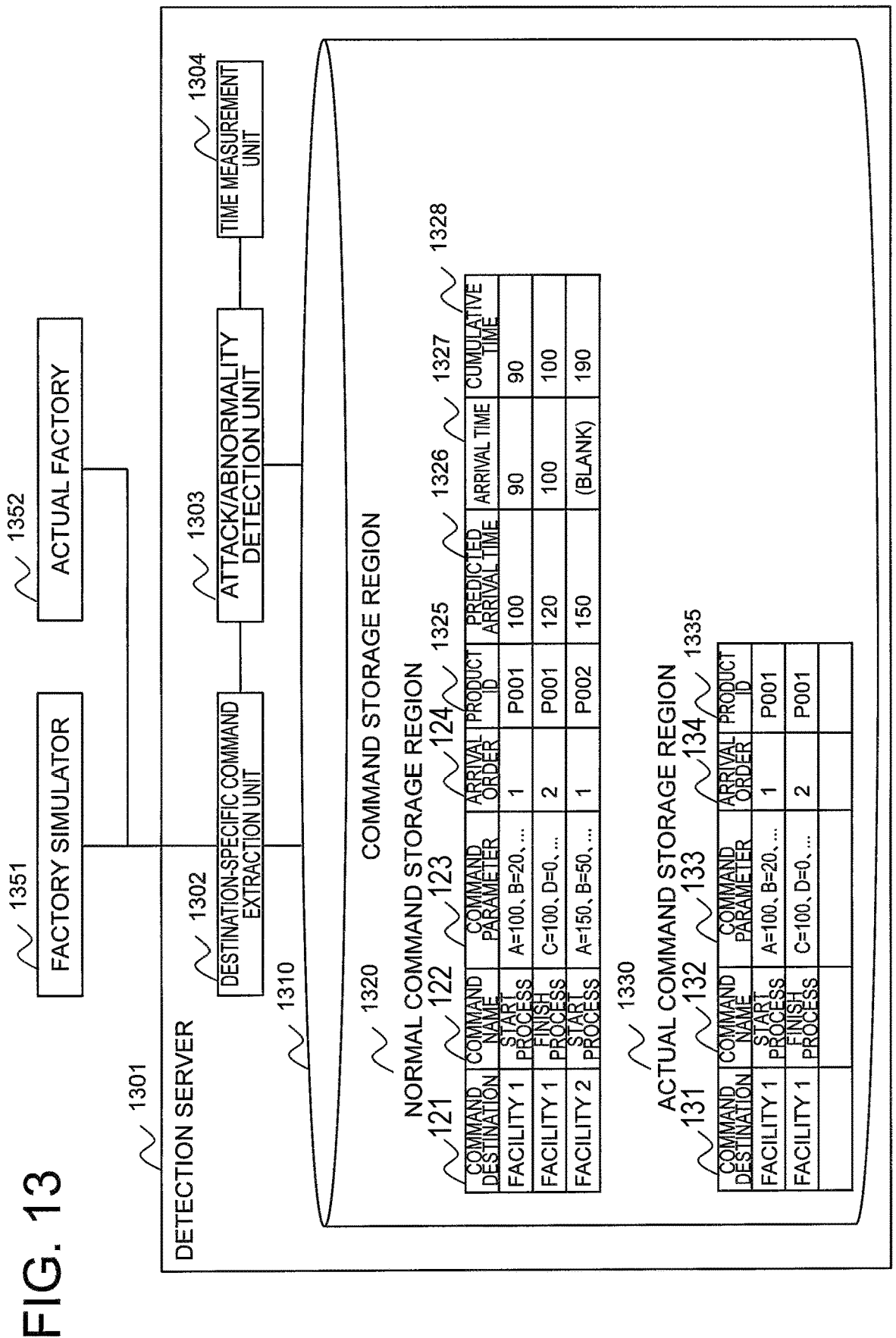
FIG. 13 is a configuration diagram for illustrating a detection server in a third embodiment of the present invention.

FIG. 13 is a configuration diagram for illustrating a detection server 1301 in a third embodiment of the present invention. The detection server 1301 corresponds to a specific example of the attack/abnormality detection device.

Compared with the detection server 101 of FIG. 1, the detection server 1301 is different from the detection server 101 in that the detection server 1301 further includes a time measurement unit 1304, and a product ID 1325 1335, a predicted arrival time 1326, an arrival time 1327, and a cumulative time 1328 are further added to data items stored by a normal command storage region 1320 and an actual command storage region 1330. Thus, the following description is given by mainly focusing on this difference.

Figure 14:
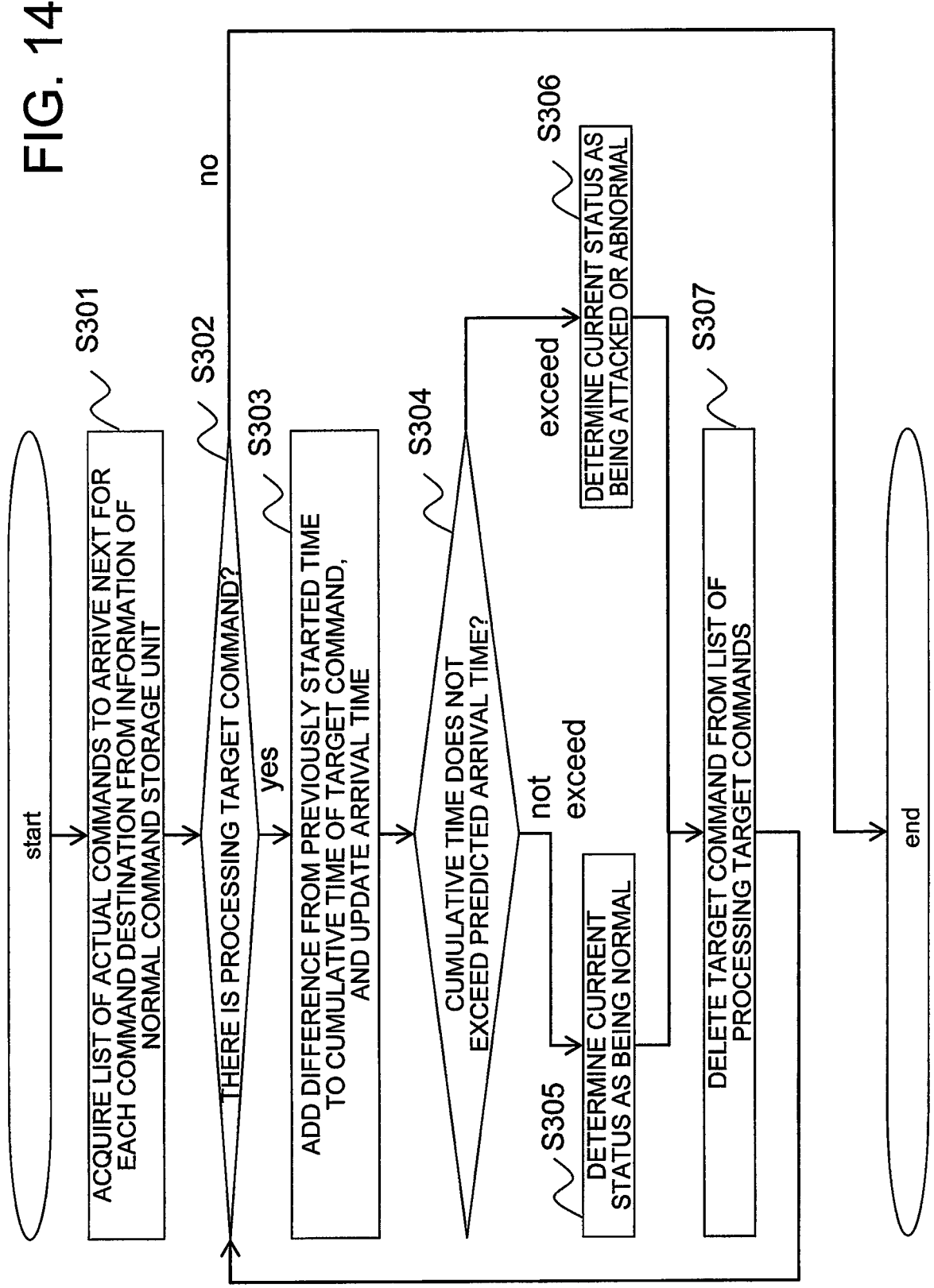
FIG. 14 is a flowchart for illustrating a series of operations of attack/abnormality detection processing to be executed by the detection server in the third embodiment of the present invention.

FIG. 14 is a flowchart for illustrating a series of operations of attack/abnormality detection processing to be executed by the detection server 1301 in the third embodiment of the present invention. Now, a description is given of the attack/abnormality detection processing to be executed by a destination-specific command extraction unit 1302 and an attack/abnormality detection unit 1303 in the detection server 1301 with reference to the flowchart illustrated in FIG. 14.

In Step S301, the destination-specific command extraction unit 1302 is started by the time measurement unit 1304. Then, the destination-specific command extraction unit 1302 extracts, for each command destination from the normal command storage region 1320, a manufacturing command having the smallest arrival order from among manufacturing commands having a blank arrival time 1327, and stores the manufacturing command as a list of actual commands to arrive next.

Next, in Step S302, the destination-specific command extraction unit 1302 examines whether or not there is a manufacturing command among the list of actual commands to arrive next. Then, when there is a manufacturing command among the list of actual commands to arrive next, the destination-specific command extraction unit 1302 extracts one from the list, and the processing proceeds to Step S303. On the contrary, when there is no manufacturing command among the list of actual commands to arrive next, the destination-specific command extraction unit 1302 ends the series of processing steps.

When the processing proceeds to Step S303, the destination-specific command extraction unit 1302 adds a difference between a previously started time and a current time to the cumulative time of the manufacturing command extracted in Step S302.

Further, when there is a manufacturing command having the same command destination and the same arrival order in the actual command storage region 1330, the destination-specific command extraction unit 1302 updates the arrival time with the cumulative time, and updates the arrival time 1327 and a cumulative time 1328 of that manufacturing command of the normal command storage region 1320.

Next, in Step S304, an attack/abnormality detection unit 1303 examines whether or not the cumulative time of the manufacturing command exceeds the predicted arrival time. Then, when the cumulative time of the manufacturing command does not exceed the predicted arrival time, the attack/abnormality detection unit 1303 determines the current status as being normal, and the processing proceeds to Step S305.

On the contrary, when the cumulative time of the manufacturing command exceeds the predicted arrival time, the attack/abnormality detection unit 1303 determines the current status as being attacked or abnormal, and the processing proceeds to Step S306. After that, the processing proceeds to Step S307 in any of the determination results.

When the processing proceeds to Step S307, the destination-specific command extraction unit 1302 deletes a manufacturing command that has been a processing target from the list of actual commands to arrive next. After that, the processing returns to Step S302, and repeats a series of processing steps for the next processing target command.

Figure 15:
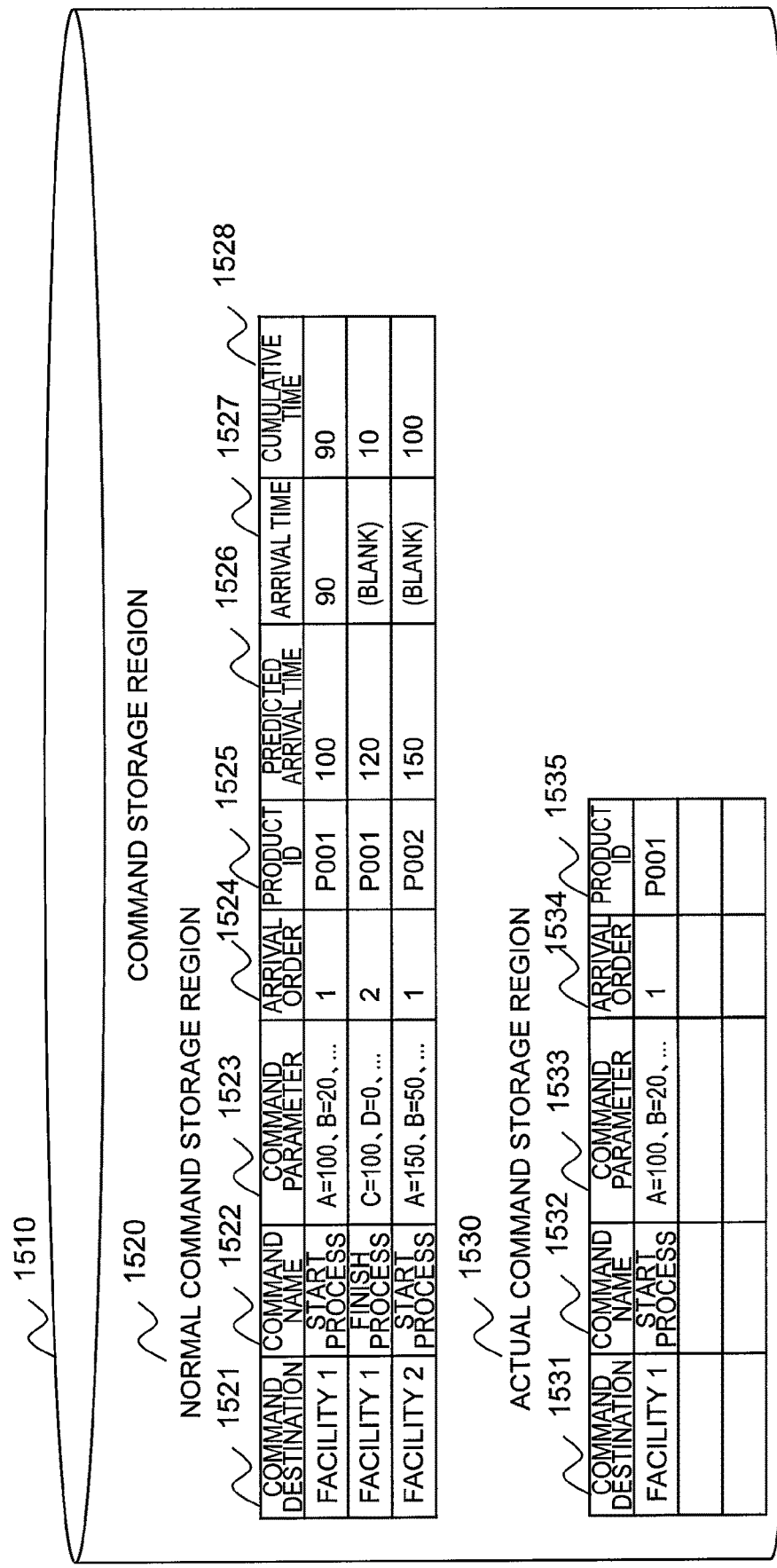
FIG. 15 is a diagram for illustrating how a command storage region is stored as a specific example of the command storage region in the third embodiment of the present invention.
Figure 16:
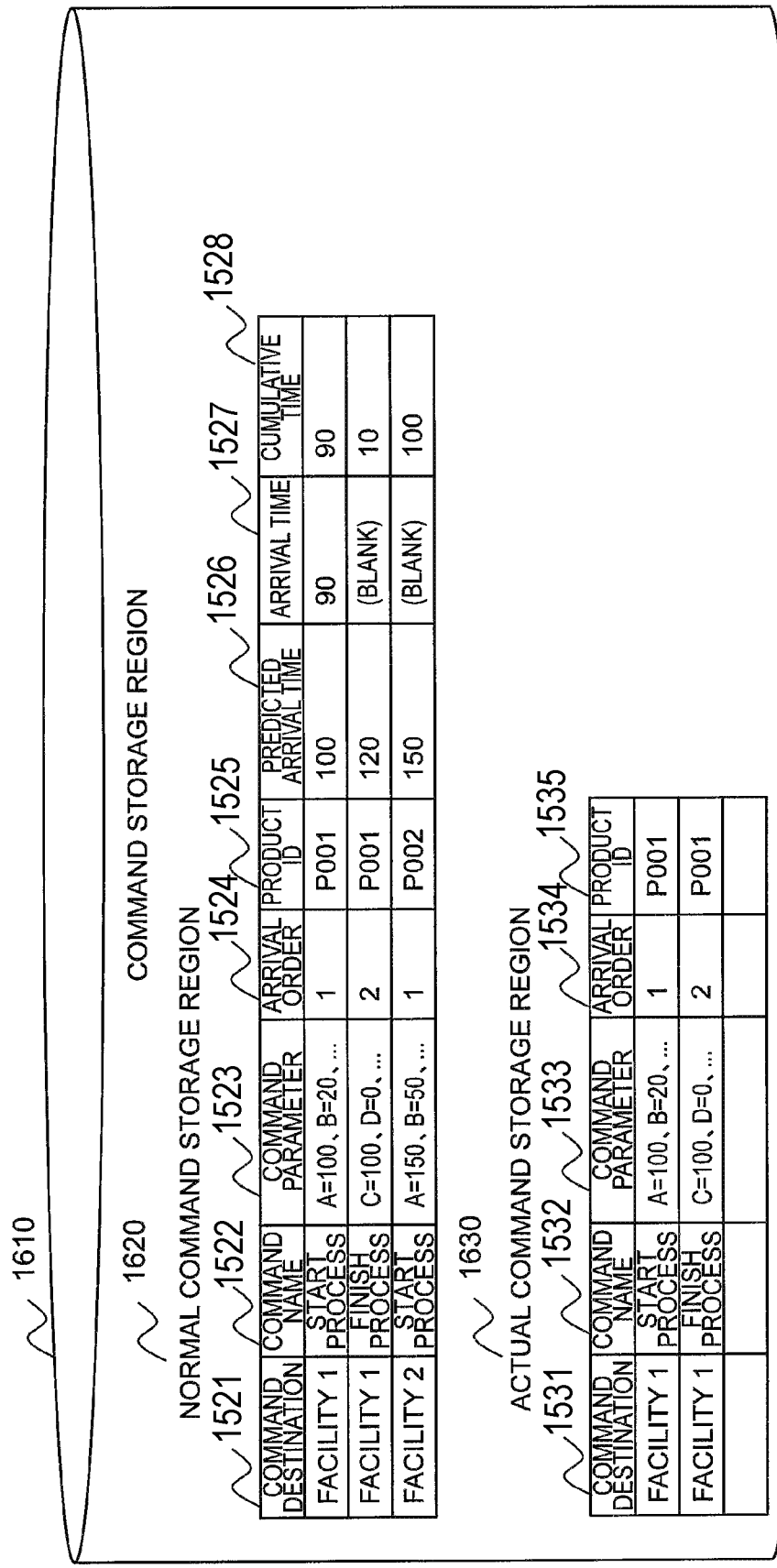
FIG. 16 is a diagram for illustrating how an updated command storage region is stored after reception of an additional manufacturing command from the actual factory under a state of the example of the command storage region illustrated in FIG. 15, as a specific example of the command storage region in the third embodiment of the present invention.

A specific description is given of operation processing of detecting attack/abnormality in the third embodiment by using examples of command storage regions of FIG. 15 and FIG. 16.

FIG. 15 is a diagram for illustrating how a command storage region 1510 is stored as a specific example of the command storage region 1310 in the third embodiment of the present invention. First, a description is given of an example of operation processing of detecting attack/abnoimality for the command storage region 1510 illustrated in FIG. 15.

It is assumed that a normal command storage region 1520 stores a result of the destination-specific command extraction unit 1302 interpreting a manufacturing command transmitted from a factory simulator 1351, extracting a command destination 1521, a command name 1522, a command parameter 1523, a product ID 1525, and a predicted arrival time 1526, and assigning those pieces of data with an arrival order 1524.

Meanwhile, it is assumed that an actual command storage region 1530 stores a result of the destination-specific command extraction unit 1302 interpreting a manufacturing command transmitted from an actual factory 1352, extracting a command destination 1531, a command name 1532, a command parameter 1533, and a product ID 1535, and assigning those pieces of data with an arrival order 1534.

Now, a description is given of an operation based on an example of a normal state in which three manufacturing commands are stored in the normal command storage region 1520 and one manufacturing command is stored in an actual command storage region 1530.

FIG. 16 is a diagram for illustrating, as a specific example of the command storage region 1310 in the third embodiment of the present invention, how an updated command storage region 1610 is stored after reception of an additional manufacturing command from the actual factory 1352 under a state of the example of the command storage region 1510 illustrated in FIG. 15.

More specifically, the example of the command storage region 1610 corresponds to a state in which the destination-specific command extraction unit 1302 receives one additional manufacturing command "(command destination=facility 1, command name=finish process, command parameter=C=100, D=0, . . . , arrival order=2, product ID=P001)" from the actual factory 1352 and stores the additional manufacturing command in an actual command storage region 1630 under the state of the example of the command storage region 1510 illustrated in FIG. 15.

In this case, when the time measurement unit 1304 requests the destination-specific command extraction unit 1302 to start processing of detecting an attack/abnormality relating to exceeding of time, the destination-specific command extraction unit 1302 acquires "(command destination=facility 1, command name=finish process, command parameter=C=100, D=0, . . . , arrival order=2, product ID=P001, predicted arrival time=120, arrival time=(blank), cumulative time=10), (command destination=facility 2, command name=start process, command parameter=A=150, B=50, . . . , arrival order=1, product ID=P002, predicted arrival time=150, arrival time=(blank), cumulative time=100)" from the normal command storage region 1620.

In this case, when a difference in time between last start of the time measurement unit 1304 and the current time is 90, as a result of updating the arrival time and the cumulative time, the destination-specific command extraction unit 1302 acquires "(command destination=facility 1, command name=finish process, command parameter=C=100, D=0, . . . , arrival order=2, product ID=P001, predicted arrival time=120, arrival time=100, cumulative time=100), (command destination=facility 2, command name=start process, command parameter=A=150, B=50, . . . , arrival order=1, product ID=P002, predicted arrival time=150, arrival time=(blank), cumulative time=190)".

At this time, the cumulative time exceeds the predicted arrival time for "(command destination=facility 2, command name=start process, command parameter=A=150, B=50, . . . , arrival order=1, product ID=P002, predicted arrival time=150, arrival time=(blank), cumulative time=190)". Thus, the attack/abnormality detection unit 1303 determines the current status as being attacked or abnormal.

In this manner, in the third embodiment, it is possible to obtain a significant effect of being able to detect an attack/abnormality based on a difference between the predicted arrival time and the cumulative time by using the predicted arrival time, arrival time, and cumulative time of a specific manufacturing command even when the destination of the manufacturing command and the product ID are discarded.

REFERENCE SIGNS LIST

101 detection server, 102 destination-specific command extraction unit, 103 attack/abnormality detection unit, 110 command storage region, 120 normal command storage region, 130 actual command storage region, 151 factory simulator, 152 actual factory, 301 arithmetic device, 302 external storage device, 303 main memory device, 304 communication device, 305 bus

The invention claimed is:

1. An attack/abnormality detection device, which is configured to detect an attack or an abnormality included in a manufacturing command in an actual factory, the attack/abnormality detection device comprising:
a memory having a normal command storage region storing a set of normal manufacturing commands transmitted from a factory simulator, and an actual command storage region storing a set of actual manufacturing commands transmitted from the actual factory; and
processing circuitry configured to:
receive, from the actual factory, an actual manufacturing command containing a command destination, a command name, and a command parameter;
assign an actual manufacturing command having the same command destination with an arrival order number in order of reception of the actual manufacturing command;
store the actual manufacturing command into the actual command storage region as one element of the set of actual manufacturing commands;
extract, when an actual manufacturing command is received, a group of normal manufacturing command elements having the same command destination as a command destination contained in the currently received actual manufacturing command from among the set of normal manufacturing commands stored in the normal command storage region, where the extracted group has a configuration including a command destination, a command name, a command parameter, and an arrival order; and
extract a group of actual manufacturing command elements having the same command destination as the command destination contained in the currently received actual manufacturing command from among the set of actual manufacturing commands stored in the actual command storage region;
execute first detection processing of comparing the extracted group of normal manufacturing command elements and the extracted group of actual manufacturing command elements with each other for each arrival order, to thereby detect the attack or the abnormality of the currently received actual manufacturing commands.

2. The attack/abnormality detection device according to claim 1, wherein the processing circuitry is further configured to:
receive, as a result of simulation by a factory simulator, a normal manufacturing command having the same command destination, command name, and command parameter as a command destination, command name, and command parameter of an actual manufacturing command that is transmitted from the actual factory when an operation of the actual factory is normal; and
assign a normal manufacturing command having the same command destination with an arrival order number in order of reception of the normal manufacturing command, and store the normal manufacturing command into the normal command storage region as one element of the set of normal manufacturing commands.

3. The attack/abnormality detection device according to claim 1,
wherein each of the actual manufacturing command and the normal manufacturing command received by the processing circuitry contains identification information for identifying a target to which a manufacturing command is to be applied, in addition to the command destination, and
wherein the processing circuitry is further configured to:
extract, when the currently received actual manufacturing command is temporarily determined to be normal as a result of execution of the first detection processing, and the actual manufacturing command is currently received, a second group of normal manufacturing command elements having the same identification information as the identification information contained in the currently received actual manufacturing command from among the set of normal manufacturing commands stored in the normal command storage region, the second group of normal manufacturing command element having a configuration including a command destination, a command name, a command parameter, an arrival order, and identification information;
extract a second group of actual manufacturing command elements having the same identification information as the identification information contained in the currently received actual manufacturing command from among the set of actual manufacturing commands stored in the actual command storage region, the second group of actual manufacturing command elements having a configuration including a command destination, a command name, a command parameter, an arrival order, and identification information;
execute second detection processing of comparing the extracted second group of normal manufacturing commands and the extracted second group of actual manufacturing commands with each other; and
finally determine that the currently received actual manufacturing command is normal when the extracted second group of actual manufacturing commands matches or is a subset of the extracted second group of normal manufacturing commands.

4. The attack/abnormality detection device according to claim 2,
wherein each of the actual manufacturing command and the normal manufacturing command received by the processing circuitry contains identification information for identifying a target to which a manufacturing command is to be applied, in addition to the command destination,
wherein the processing circuitry is further configured to:
extract, when the currently received actual manufacturing command is temporarily determined to be normal as a result of execution of the first detection processing, and the actual manufacturing command is currently received, a second group of normal manufacturing elements having the same identification information as the identification information contained in the currently received actual manufacturing command from among the set of normal manufacturing commands stored in the normal command storage region, the second group of normal manufacturing command elements having a configuration including a command destination, a command name, a command parameter, an arrival order, and identification information; and
extract a second group of actual manufacturing command elements having the same identification information as the identification information contained in the currently received actual manufacturing command from among the set of actual manufacturing commands stored in the actual command storage region, the second group of actual manufacturing command elements having a configuration including a command destination, a command name, a command parameter, an arrival order, and identification information;

execute second detection processing of comparing the extracted second group of normal manufacturing commands and the extracted second group of actual manufacturing commands with each other; and finally determine that the currently received actual manufacturing command is normal when the extracted second group of actual manufacturing commands matches or is a subset of the extracted second group of normal manufacturing commands.

5. The attack/abnormality detection device according to claim 1, further comprising a timer configured to measure an arrival time for an actual manufacturing command to arrive next, wherein the normal manufacturing command received by the processing circuitry contains a predicted arrival time, wherein the processing circuitry is configured to extract a normal manufacturing command corresponding to the actual manufacturing command to arrive next from among the set of normal manufacturing commands stored in the normal command storage region, along with a corresponding predicted arrival time, and wherein the processing circuitry is configured to detect that a reception error of an actual normal command has occurred when the actual manufacturing command to arrive next has failed to be received even when the corresponding predicted arrival time has been exceeded.

6. The attack/abnormality detection device according to claim 2, further comprising a timer configured to measure an arrival time for an actual manufacturing command to arrive next, wherein the normal manufacturing command received by the processing circuitry contains a predicted arrival time, wherein the processing circuitry is configured to extract a normal manufacturing command corresponding to the actual manufacturing command to arrive next from among the set of normal manufacturing commands stored in the normal command storage region, along with a corresponding predicted arrival time, and wherein the processing circuitry is configured to detect that a reception error of an actual normal command has occurred when the actual manufacturing command to arrive next has failed to be received even when the corresponding predicted arrival time has been exceeded.

7. The attack/abnormality detection device according to claim 3, further comprising a timer configured to measure an arrival time for an actual manufacturing command to arrive next, wherein the normal manufacturing command received by the processing circuitry contains a predicted arrival time, wherein the processing circuitry is configured to extract a normal manufacturing command corresponding to the actual manufacturing command to arrive next from among the set of normal manufacturing commands stored in the normal command storage region, along with a corresponding predicted arrival time, and wherein the processing circuitry is configured to detect that a reception error of an actual normal command has occurred when the actual manufacturing command to arrive next has failed to be received even when the corresponding predicted arrival time has been exceeded.

8. The attack/abnormality detection device according to claim 4, further comprising a timer configured to measure an arrival time for an actual manufacturing command to arrive next, wherein the normal manufacturing command received by the processing circuitry contains a predicted arrival time, wherein the processing circuitry is configured to extract a normal manufacturing command corresponding to the actual manufacturing command to arrive next from among the set of normal manufacturing commands stored in the normal command storage region, along with a corresponding predicted arrival time, and wherein the processing circuitry is configured to detect that a reception error of an actual normal command has occurred when the actual manufacturing command to arrive next has failed to be received even when the corresponding predicted arrival time has been exceeded.

9. An attack/abnormality detection method to be executed by an attack/abnormality detection device configured to detect an attack or an abnormality contained in a manufacturing command in an actual factory, the attack/abnormality detection method comprising:

a first step of receiving, from the actual factory, an actual manufacturing command containing a command destination, a command name, and a command parameter;

a second step of assigning an actual manufacturing command having the same command destination with an arrival order number in order of reception of the actual manufacturing command, and storing the actual manufacturing command into an actual command storage region as one element of a set of actual manufacturing commands;

a third step of storing, in advance, a normal set of normal manufacturing commands transmitted by a factory simulator into a normal command storage region, the normal manufacturing commands having a configuration including a command destination, a command name, a command parameter, and an arrival order;

a fourth step of extracting, when thoan actual manufacturing command is received, a group of normal manufacturing command elements having the same command destination as a command destination contained in the currently received actual manufacturing command from among the set of normal manufacturing commands stored in the normal command storage region in the third step;

a fifth step of extracting a group of actual manufacturing command elements having the same command destination as the command destination contained in the currently received actual manufacturing command from among the set of actual manufacturing commands stored in the actual command storage region; and a sixth step of executing first detection processing of comparing the extracted group of normal manufacturing command elements and the extracted group of actual manufacturing command elements with each other for each arrival order, to thereby detect the attack or the abnormality of the currently received actual manufacturing command.

10. The attack/abnormality detection method according to claim 9,
    wherein each normal manufacturing command stored in the normal command storage region as the set of normal manufacturing commands in the third step further contains a predicted arrival time, and
    wherein the attack/abnormality detection method further comprises:
        a seventh step of extracting a normal manufacturing command corresponding to an actual manufacturing command to arrive next from among the set of normal manufacturing commands stored in the normal command storage region in the third step, along with a corresponding predicted arrival time; and
        an eighth step of detecting that a reception error of an actual normal command has occurred when the actual manufacturing command to arrive next has failed to be received even when the corresponding predicted arrival time has been exceeded.

* * * * *